US007738912B1

(12) United States Patent
Hawkins et al.

(10) Patent No.: US 7,738,912 B1
(45) Date of Patent: Jun. 15, 2010

(54) MOBILE COMPUTING DEVICE INTERFACE

(75) Inventors: Jeffrey Charles Hawkins, Atherton, CA (US); Priscilla S. Cinque, Santa Cruz, CA (US); Gregory T. Shirai, Oakland, CA (US); Robert Yuji Haitani, Menlo Park, CA (US); Nancy Gayed, San Francisco, CA (US)

(73) Assignee: Palm, Inc., Sunnyvale, CA (US)

( * ) Notice: Subject to any disclaimer, the term of this patent is extended or adjusted under 35 U.S.C. 154(b) by 211 days.

(21) Appl. No.: 11/744,661

(22) Filed: May 4, 2007

Related U.S. Application Data

(63) Continuation of application No. 10/773,514, filed on Feb. 5, 2004, now Pat. No. 7,231,229.

(60) Provisional application No. 60/455,178, filed on Mar. 16, 2003, provisional application No. 60/460,287, filed on Apr. 2, 2003, provisional application No. 60/479,392, filed on Jun. 17, 2003.

(51) Int. Cl.
*H04M 1/00* (2006.01)

(52) U.S. Cl. .................. 455/550.1; 455/564; 455/566

(58) Field of Classification Search .......... 455/564, 455/566, 550.1, 90.1–90.3, 91, 95, 575, 556.1, 455/556.2, 575.1; 379/93.05, 93.19, 93.17, 379/93.09, 93.23, 93.24; 345/173, 174, 204, 345/205, 156, 1.1, 1.2
See application file for complete search history.

(56) References Cited

U.S. PATENT DOCUMENTS

| | | | |
|---|---|---|---|
| 4,279,021 A | 7/1981 | See et al. |
| 4,415,065 A | 11/1983 | Sandstedt |
| 4,587,630 A | 5/1986 | Straton et al. |
| 4,725,694 A | 2/1988 | Auer et al. |
| 4,764,770 A | 8/1988 | Church |
| 4,887,212 A | 12/1989 | Zamora et al. |
| 4,892,981 A | 1/1990 | Soloway et al. |
| 4,916,441 A | 4/1990 | Gombrich |
| 5,010,547 A | 4/1991 | Johnson et al. |
| D320,598 S | 10/1991 | Auerbach et al. |
| 5,067,164 A | 11/1991 | Denker et al. |

(Continued)

FOREIGN PATENT DOCUMENTS

EP 0149762 A1 7/1986

(Continued)

OTHER PUBLICATIONS

Screen Dumps of Microsoft Internet Explorer 6.0, 2001, pp. 1-13.

(Continued)

*Primary Examiner*—Sujatha Sharma
(74) *Attorney, Agent, or Firm*—Fenwick & West LLP

(57) ABSTRACT

In a communication device, user activation of a speed-dial button causes a context-sensitive menu to be displayed. The menu lists available options, or communication modes, for contacting the party associated with the speed-dial button. The user can select an item from the menu in order to initiate communication with the selected party using the communication mode associated with the menu item. In various aspects, the invention provides additional functionality for redialing previously called contact numbers, assigning speed-dial buttons to other commands and functions, and displaying presence information for contacts.

19 Claims, 16 Drawing Sheets

U.S. PATENT DOCUMENTS

| | | | |
|---|---|---|---|
| 5,101,439 A | 3/1992 | Kiang | |
| 5,218,188 A | 6/1993 | Hanson | |
| 5,227,614 A | 7/1993 | Danielson et al. | |
| 5,303,288 A * | 4/1994 | Duffy et al. | 455/564 |
| 5,334,824 A | 8/1994 | Martinez | |
| 5,335,276 A | 8/1994 | Thompson et al. | |
| 5,336,001 A | 8/1994 | Lichtenberg | |
| 5,345,615 A | 9/1994 | Garofalo | |
| 5,357,065 A | 10/1994 | Mitamura et al. | |
| 5,359,317 A | 10/1994 | Gomez et al. | |
| 5,379,057 A | 1/1995 | Clough et al. | |
| 5,392,447 A | 2/1995 | Schlack et al. | |
| D359,920 S | 7/1995 | Sakamoto | |
| 5,430,436 A | 7/1995 | Fennell | |
| 5,465,401 A | 11/1995 | Thompson | |
| 5,494,363 A | 2/1996 | Hochgesang | |
| 5,503,484 A | 4/1996 | Louis | |
| 5,650,776 A | 7/1997 | Mitchell et al. | |
| 5,705,995 A | 1/1998 | Laflin et al. | |
| 5,742,894 A | 4/1998 | Jambhekar et al. | |
| 5,779,030 A | 7/1998 | Ikegami et al. | |
| 5,812,651 A | 9/1998 | Kaplan | |
| 5,813,778 A | 9/1998 | Shih | |
| 5,903,852 A | 5/1999 | Schaupp, Jr. et al. | |
| 5,905,863 A | 5/1999 | Knowles et al. | |
| 5,917,906 A | 6/1999 | Thornton | |
| 5,936,614 A | 8/1999 | An et al. | |
| 5,941,648 A | 8/1999 | Robinson et al. | |
| 5,966,652 A | 10/1999 | Coad et al. | |
| D416,256 S | 11/1999 | Griffin et al. | |
| 6,038,547 A | 3/2000 | Casto | |
| 6,058,304 A | 5/2000 | Callaghan et al. | |
| 6,101,531 A | 8/2000 | Eggleston et al. | |
| 6,151,507 A | 11/2000 | Laiho et al. | |
| 6,157,630 A | 12/2000 | Adler et al. | |
| 6,166,342 A | 12/2000 | Chou | |
| 6,198,053 B1 | 3/2001 | Chou | |
| 6,226,362 B1 | 5/2001 | Gerszberg et al. | |
| 6,230,197 B1 | 5/2001 | Beck et al. | |
| 6,256,631 B1 | 7/2001 | Malcolm | |
| 6,259,931 B1 | 7/2001 | Singh | |
| 6,278,442 B1 | 8/2001 | Griffin et al. | |
| 6,289,226 B1 | 9/2001 | Levken et al. | |
| 6,295,372 B1 | 9/2001 | Hawkins et al. | |
| 6,310,609 B1 | 10/2001 | Morgenthaler | |
| 6,333,973 B1 | 12/2001 | Smith et al. | |
| 6,346,952 B1 | 2/2002 | Shtivelman | |
| D454,349 S | 3/2002 | Makidera et al. | |
| 6,363,349 B1 | 3/2002 | Urs et al. | |
| 6,370,018 B1 | 4/2002 | Miller et al. | |
| D456,794 S | 5/2002 | Laverick et al. | |
| 6,396,482 B1 | 5/2002 | Griffin et al. | |
| 6,415,138 B2 | 7/2002 | Sirola et al. | |
| D462,354 S | 9/2002 | Kimbre et al. | |
| 6,452,588 B2 | 9/2002 | Griffin et al. | |
| D464,962 S | 10/2002 | MacGregor et al. | |
| 6,489,950 B1 | 12/2002 | Griffin et al. | |
| D468,714 S | 1/2003 | Maruska et al. | |
| D469,749 S | 2/2003 | Kim | |
| D470,842 S | 2/2003 | Bhatia et al. | |
| 6,516,202 B1 | 2/2003 | Hawkins et al. | |
| D471,559 S | 3/2003 | De Saulles | |
| D477,597 S | 7/2003 | Laverick et al. | |
| 6,611,254 B1 | 8/2003 | Griffin et al. | |
| 6,611,255 B2 | 8/2003 | Griffin et al. | |
| 6,630,944 B1 | 10/2003 | Kakuta et al. | |
| 6,690,931 B2 | 2/2004 | Heo | |
| D488,478 S | 4/2004 | Laverick et al. | |
| 6,799,033 B2 | 9/2004 | Kanefsky | |
| 6,867,763 B2 | 3/2005 | Griffin et al. | |
| 6,870,828 B1 | 3/2005 | Giordano, III | |
| 6,873,317 B1 | 3/2005 | Griffin et al. | |
| 6,891,529 B2 | 5/2005 | Ladouceur et al. | |
| 6,919,879 B2 | 7/2005 | Griffin et al. | |
| 6,938,067 B2 | 8/2005 | Hershenson | |
| 6,941,134 B2 | 9/2005 | White | |
| 6,973,299 B2 * | 12/2005 | Apfel | 455/412.2 |
| 6,981,223 B2 | 12/2005 | Becker et al. | |
| 7,003,305 B2 | 2/2006 | Urs | |
| 7,007,239 B1 | 2/2006 | Hawkins et al. | |
| D518,820 S | 4/2006 | Hawkins et al. | |
| D518,825 S | 4/2006 | Hawkins et al. | |
| D519,502 S | 4/2006 | Hawkins et al. | |
| 7,028,263 B2 | 4/2006 | Maguire | |
| 7,054,441 B2 | 5/2006 | Pletikosa | |
| 7,061,403 B2 | 6/2006 | Fux | |
| 7,103,010 B2 | 9/2006 | Melideo | |
| 7,103,348 B1 | 9/2006 | Levit et al. | |
| 7,103,388 B2 | 9/2006 | Scott | |
| 7,266,584 B2 | 9/2007 | Mullen et al. | |
| 2001/0006889 A1 | 7/2001 | Kraft | |
| 2001/0021649 A1 | 9/2001 | Kinnunen et al. | |
| 2001/0025309 A1 | 9/2001 | Macleod Beck et al. | |
| 2002/0019243 A1 | 2/2002 | Zhang et al. | |
| 2002/0044136 A1 | 4/2002 | Griffin et al. | |
| 2002/0065069 A1 * | 5/2002 | Phillips | 455/419 |
| 2002/0069218 A1 | 6/2002 | Sull et al. | |
| 2002/0115476 A1 | 8/2002 | Padawer et al. | |
| 2002/0147614 A1 | 10/2002 | Doerr et al. | |
| 2002/0190957 A1 | 12/2002 | Lee et al. | |
| 2003/0005048 A1 | 1/2003 | Risalvato | |
| 2003/0065788 A1 | 4/2003 | Salomaki | |
| 2003/0114174 A1 | 6/2003 | Walsh et al. | |
| 2004/0137884 A1 | 7/2004 | Engstrom et al. | |
| 2004/0166829 A1 | 8/2004 | Nakae et al. | |
| 2004/0185883 A1 | 9/2004 | Rukman | |
| 2004/0218609 A1 | 11/2004 | Foster et al. | |
| 2004/0233159 A1 | 11/2004 | Badarneh | |
| 2004/0239639 A1 | 12/2004 | Stavely et al. | |
| 2005/0097189 A1 | 5/2005 | Kashi | |
| 2005/0159107 A1 * | 7/2005 | Mauney et al. | 455/41.2 |
| 2006/0034434 A1 | 2/2006 | Kashi | |
| 2007/0265032 A1 * | 11/2007 | Aisenberg | 455/556.1 |
| 2008/0273079 A1 * | 11/2008 | Campbell et al. | 348/14.08 |

FOREIGN PATENT DOCUMENTS

| | | | |
|---|---|---|---|
| EP | 1104151 A2 | 5/2001 | |

OTHER PUBLICATIONS

Aiken et al., "Microsoft Computer Dictionary," Microsoft Press, Fifth Edition, p. 523.

"3GPP2 Multimedia Messaging System—MMS Specification Overview—Revision: A" [online], May 2003, Mobile Messaging, [retrieved on Dec. 10, 2004]. Retrieved from the Internet: <URL:http://www.lebodic.net/left.htm.

*American Programmer*, N.Y., American Programmer, Inc. (Dec. 1991), pp. 4-33.

*At Last, Technology Harnesse [sic] One of the Most Powerf [sic] Forces known to Man.*, Foster City, GO Corporation, 1991, 14 pages.

AT&T New Release, *NCR Cuts Price of 3170 Notebook Computer 11 to 19 Percent* [online]. (Mar. 8, 1993), Retrieved from the Internet: <URL:http://www.att.com/press/0393/930308.nca.html> 2 pages.

Carr, R.M., *The Point of the Pen*, Byte (Feb. 1991, Reprinted), 10 pages.

Cullen, A., *Connecting With Your E0 Cellular Module*, Mountain View, EO, Inc., 1992, 1993, pp. ii-33.

Cullen, A., *Getting Started With Your E0 Personal Communicator*, Mountain View, EO, Inc., 1992, 1993, pp. ii-74.

Cullen, A., *Lookup Guide to the EO Personal Communicator*, Mountain View, EO, Inc., 1992, 1993, pp. ii-320.

*Go Corporation Information Statement*, (Nov. 8, 1993), 114 pages.

Hewlett Packard, Products and services, (http://www.hp.com/) Nov. 11, 2001.

*IBM Selects Racotek Data/Voice Communications Services to Interface With Touchmobile Product*, PR Newswire (Jan. 25, 1993), 2 pages.

*IBM TouchMobile Information and Planning Guide, International Business Machines Incorporated* (Mar. 1993), 20 pages.

*IBM TouchMobile Solution for Data Capture and Communication, Keeping Your Business Moving in the 90s, International Business Machines Incorporated* (Jan. 1993), 13 pages.

*IBM'S Touchmobile Helps Field Workers Collect Data at the Touch of a Finger*, PR Newswire (Jan. 26, 1993), 2 pages.

"An Introduction to Mobile Messaging" [online], May 2003, Mobile Messaging, [retrieved on Dec. 10, 2004]. Retrieved from the Internet: <URL:http://www.lebodic.net/intro.htm.

MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html> 2 pages.

MacNeill, D., *Wireless Newton Technology Goes to Work, On The Go Magazine* [online]. (Sep. 8, 1993), Retrieved from the Internet: <URL:http://www.pencomputing.com/Newton/NewtonNotes1.html.>2 pages.

Maki, K., *The AT&T EO Travel Guide*, N.Y., John Wiley & Sons, Inc., 1993, pp. iii-555.

Nokia, Frequently Asked Questions;[online], [retrieved on Nov. 17, 2003], <http://www.nokia.co.in/nokia_apac/india/faqs_list/0,18778,39_41,00.html>.

Nokia Introduces Mobile Chat With Nokia 3310, [online], Sep. 1, 2000, [retrieved on Nov. 17, 2003], <http://www.mobiletechnews.com/info/2000/09/01/142022.htm>.

Schlender, B. R., *Hot New PCs That Read Your Writing, Fortune* (Feb. 11, 1991, Reprinted), 6 pages.

Stock, R., *The World of Messaging an Introduction to Personal Communications*, Mountain View, EO, Inc., 1992, 1993, pp. ii-69.

T-Mobile Products; Handhelds (http://www.tmobile.com) Sep. 28, 2002.

T-Mobile Products; Sidekick (http://www.tmobile.com) Sep. 28, 2002.

Toshiba Computer Systems Group (http://www.toshiba.com) May 28, 2002.

Toshiba Computer Systems Group: Pocket PC e570 (http://www.pda.toshiba.com) Jul. 7, 2001.

* cited by examiner

MOBILE COMPUTING DEVICE INTERFACE

CROSS-REFERENCE TO RELATED APPLICATIONS

This application is a continuation of U.S. patent application Ser. No. 10/773,514, filed Feb. 5, 2004, entitled "Communication Device Interface" which claims priority from the following U.S. Provisional Patent Applications, the disclosures of which are incorporated herein by reference: Application No. 60/455,178, filed Mar. 16, 2003, entitled "Handheld PDA, Telephone, and Camera"; Application No. 60/460,287, filed Apr. 2, 2003, entitled "Multimodal Speed-Dial Buttons"; and Application No. 60/479,392, filed Jun. 17, 2003, entitled "Communicator".

This application is related to U.S. Utility application Ser. No. 10/225,206, filed Aug. 20, 2002, entitled "Context-Specific Interaction Through a Mobile Communications Device", the disclosure of which is incorporated herein by reference.

BACKGROUND

1. Field of the Art

The present invention is related to user interfaces for communication devices, and more particularly to configuring and activating communication modes in a unified manner.

2. Description of the Background Art

Communication devices, such as telephones, often include one or more userprogrammable speed-dial buttons that provide easy access to commonly used telephone numbers. Such buttons take many different forms and modes of operation. For example, on some phones a set of physical buttons is provided, each of which may be programmed to automatically dial one or more numbers. These buttons may also be programmed to dial additional numbers or perform other functions when preceded by a "shift" key or similar modifier key. On other phones, a single speed-dial button is provided: the user can dial a number by pressing the speed-dial button followed by a number key or number sequence. The number key or sequence specifies which telephone number should be dialed.

Some phones provide more sophisticated speed-dial button functionality. In some phones a scrollable list of previously stored telephone numbers appears on a display, such as a liquid crystal display (LCD). The user may select a number from the list by pressing arrow keys, rotating a jog/dial control, or the like; once the desired number is selected, the user may dial the number by pressing an activation or "dial" key. Such a scheme is often used in mobile telephones such as cellular phones. An advantage of such an arrangement is that the number of stored numbers is not limited by the number of physical buttons on the device.

In other phones, a display may present a number of "soft" buttons that are shown as on-screen representations of physical buttons. Each soft button may be programmed as a speed-dial button. The user may activate one of the soft buttons by touching the screen at the appropriate location; alternatively, arrow keys, jog/dial control, or other mechanisms may be available for selecting and activating one of the buttons. Modifier keys may be provided for accessing alternative functionality for each of the soft buttons. For example, a user may press a button to switch among several "banks" of telephone numbers. Once the desired telephone number is shown on the screen, the user may activate the corresponding soft button to dial the number.

Typically, each speed-dial button, whether implemented as a physical button, an item in a scrollable list, or a soft button, operates to dial a specific telephone number associated with an individual or a company. If a user wishes to store more than one telephone number for a particular individual, such as for example a work number, a home number, and a mobile number, the user must generally program three separate speed-dial buttons. Conventional speed-dial buttons do not offer any functionality for allowing the user to easily select among two or more previously programmed telephone numbers for reaching the person or company associated with the speed-dial button. Furthermore, conventional speed-dial buttons are not generally assignable to other functions, such as launching applications or initiating messaging with a contact.

In addition, conventional speed-dial buttons do not generally allow a user to select alternative modes of communication. For example, if a user wishes to contact a person by text messaging or email, the user must typically navigate to a separate area of functionality on the telephone (or other communication device). Speed-dial buttons do not generally offer an integrated mechanism for accessing multiple modes of communication with a particular person or company.

Some communication devices offer a "last number redial" capability that allows a user to redial a recently called number. Generally, such functionality is provided via a separate button, command, or menu, and is not integrated with other calling or communication functions.

In addition, conventional speed-dial buttons and telephone directories in communication devices fail to provide an indication as to whether an individual is on the phone, online, or otherwise available (or unavailable) to receive a telephone call or other communication. Thus, a user is required to attempt to initiate the communication (such as by dialing the telephone number) before finding out whether or not the recipient is able or willing to receive the communication.

What is needed, then, is an improved speed-dial button scheme for communication devices, which provides easy access to two or more telephone numbers for an individual or company associated with the speed-dial button. What is further needed is a speed-dial button scheme that provides an integrated mechanism for accessing and initiating multiple modes of communication with a particular person or company. What is further needed is a button scheme that provides an integrated mechanism for accessing speed-dial features and other features, by allowing buttons to be assigned to functions other than dialing telephone numbers.

What is further needed is a mechanism for redialing previously called telephone numbers, and for accessing related functionality including alternate communication modes for previously called telephone numbers, without requiring a user to use a separate button or control.

What is further needed is a technique for displaying presence information, such as a contact's current availability to receive certain types of communication, in an integrated manner in connection with speed-dial buttons, directories, and other contact lists in a communication device.

SUMMARY

The present invention provides an easy-to-use mechanism for selecting among several available modes of communication for a particular person or company. The modes may include, for example, voice calling, voice messaging, text messaging, paging, email, or the like. In addition, for each mode, any number of addresses or numbers (handles) may be available for a particular person or company. Thus, a user can select from two or more telephone numbers, as well as email address and the like, when attempting to contact someone.

In one embodiment, the invention displays a context-sensitive menu in response to the user activating a speed-dial button, for example by pressing a physical button or soft button, or by selecting and activating an item on a screen or menu. The menu lists available options, or communication modes, for contacting the party associated with the speed-dial button. In one embodiment, as described below, the menu may be configured to default to a particular mode of communication, or to categorize, arrange, or organize the available modes according to the user's preferences.

Once the context-sensitive menu is displayed, the user can select an item from the menu in order to initiate communication with the selected party using the communication mode associated with the menu item. For example, the user may use up/down buttons, rocker switches, jog/dial knobs, and the like, to navigate to a particular displayed option, and can then press a button to activate the selected option. Alternatively, for implementations that employ a touch screen or pointing device, the user may point to a displayed option and click on it or otherwise activate it.

The present invention further provides functionality for integrated access to two or more contact mechanisms for a particular person or company. In one embodiment, the user need not explicitly program the speed-dial functionality to include two or more modes. Rather, the invention automatically recognizes that two or more user-programmed contact entries refer to the same entity, and lists contact mechanisms for all such contact entries in the context-sensitive menu, in response to the user indicating that he or she is interested in contacting the entity.

The present invention may be implemented on any communication device that provides user-activated speed-dial buttons, whether in physical form, "soft" form, scrollable lists, or according to some other mechanism. Such communication devices include, for example, wired telephones, cordless telephones, mobile telephones, personal digital assistants (PDAs), computers, pagers, communicators, and the like. The present invention may be implemented, in one embodiment, using a display that forms part of or is associated with the communication device.

The present invention thus provides a unified mechanism for initiating any of several different types of communication. Users are not forced to launch a different application, or enter a different menu or command, in order to select a particular communication mode. Furthermore, users need not look up different records for different phone numbers (or other handles) associated with a particular person or company. The invention presents all such information for a selected person or company in a unified, simplified manner. A user need only select a speed-dial button and then choose from a displayed list of available communication modes for the destination party specified by the button. By presenting, in a unified, simplified manner, all available communication modes having a handle for the selected destination party, the invention significantly simplifies the process of contacting a person or company.

In one aspect, the present invention also provides a pop-up menu including a redial list, to provide easy access to recently dialed telephone numbers and related functionality.

In one aspect, the speed-dial buttons of the present invention are extended to provide improved functionality for accessing favorite features, including for example launching applications, dialing numbers, sending pre-addressed Short Message Service (SMS) messages, accessing specific views of a phone application, and browsing saved Uniform Resource Locators (URLs).

In one aspect, the present invention also provides presence information in the context of a telephone directory, speed-dial button, or the like, so as to indicate to the user whether a contact is available to receive a communication.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The following description of system components and operation is merely exemplary of one embodiment of the present invention. Several features are described; one skilled in the art will recognize that the present invention can be implemented using any or all of the described features, either alone or in any combination. Thus the invention is not limited to any particular arrangement or combination of the features described herein.

In the following description, the term "handle" refers to any identifier that can be used for contacting a person or company. A communication device, such as a telephone, computer, or personal digital assistant, interprets a handle in order to initiate communication with the person or company specified by the handle. Examples of handles include: telephone number, email address, fax number, street address, instant messaging identifier or "screen name," pager number, and the like.

In the following description, the term "contact" refers to an individual, company, group, or other entity that can be contacted or called, and that is capable of being represented by at least one handle.

In the following description, the terms "speed-dial button" and "favorites button" are used interchangeably to refer to any button, control, or other user interface element, whether physical or virtual, that can be activated by a user to initiate a communication with a contact, or to perform another assigned function or operation.

Figure 1:
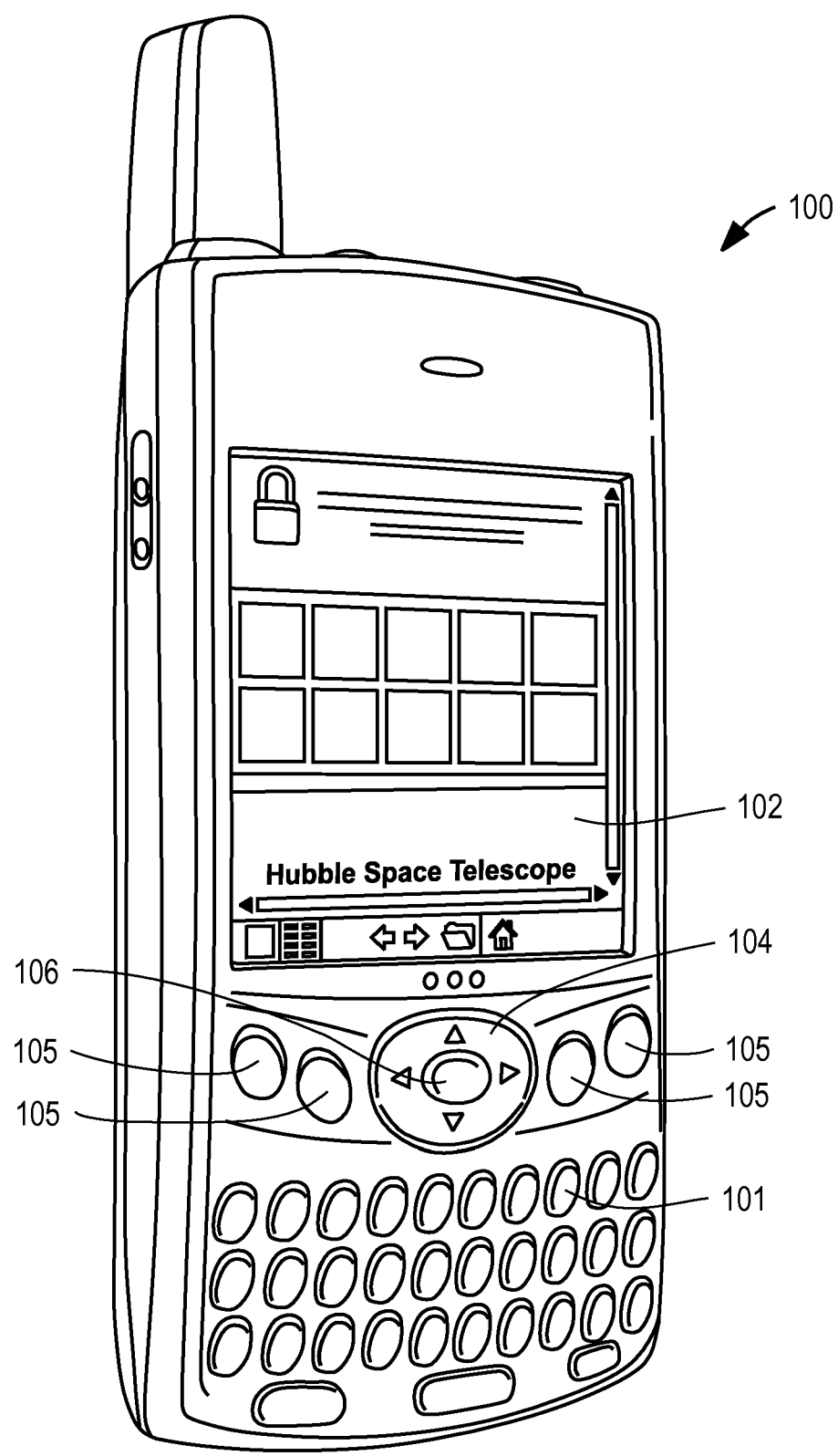
FIG. 1 depicts a handheld communication device for implementing one embodiment of the present invention.

Referring now to FIG. 1, there is shown a communication device 100 for implementing one embodiment of the present invention. In the embodiment represented by FIG. 1, device 100 is a personal communication device, PDA, cellular phone, smart phone, or communicator having wireless telephony capabilities and wireless email capabilities. One skilled in the art will recognize that the present invention can be implemented using any type of communication device, including but not limited to conventional telephones, wireless telephones, handheld email devices, handheld computers, desktop computers, laptop computers, and the like. Accordingly, the particular structure and design of device 100 as shown in FIG. 1 is merely one example of a physical device for implementing the techniques of the present invention, and is presented for illustrative purposes and not to imply any limitations on the scope of the present invention.

Device 100 includes screen 102, which may be a liquid crystal display (LCD) or other type of display for presenting output to the user, including representations of speed-dial buttons, menus, and the like. Device 100 may also include one or more mechanisms for accepting input from the user. In one embodiment, screen 102 is touch-sensitive, so that the user may interact with device 100 by touching or writing on the surface of screen 102 using a stylus, finger, or other object. Device 100 may also include keyboard 101 for enabling rapid entry of text, and may further include buttons 105 for performing various other functions associated with the operation of device 100 and its applications.

In one embodiment, device 100 includes a five-way button 104, implemented according to well-known techniques, that provides a mechanism for specifying any of at least four directions and further including an activation switch 106 in the center of button 104. In general, the user can use button 104 to select an item (such as a speed-dial button) from a set of displayed items, and activate the selected item. One of the items on screen 102 is initially highlighted; the user presses on one of the directional areas on button 104 to move the highlight to another item. For example, if the user presses on the lower section of button 104, the highlight moves to the next item positioned below the currently highlighted item. In one embodiment, if there are no further items located in the user-specified direction, the highlight remains in the same location; in another embodiment, it wraps around to the opposite edge of the displayed area. For example, if the user presses the right-hand section of button 104 while the rightmost item is highlighted, in one embodiment the rightmost item would remain highlighted, but in another embodiment the highlight would wrap around to the leftmost item. Selecting and activating on-screen objects in this manner are well known in the art.

In alternative embodiments, device 100 may include other switches or buttons in lieu of five-way button 104; for example, a jog/shuttle switch may be provided, or a three-way or two-way rocker switch, or simply a set of buttons for performing navigation functions. In yet another alternative, such navigation functionality may be provided by means of "soft" buttons, or icons, displayed on screen 102. One skilled in the art will recognize that many other input configurations are possible without departing from the essential characteristics of the present invention.

In one embodiment, device 100 includes communication capabilities. For example, device 100 may function as a cellular telephone, wireless email device, pager, text messaging device, or any combination thereof. Although no particular communication capability is essential to the present invention, the techniques disclosed herein provide additional utility in context of such functionality, because in one embodiment the invention allows the user to easily select from at least two modes and/or handles for initiating communication, as will be described in more detail below.

Alternate Contact Modes

Figure 2:
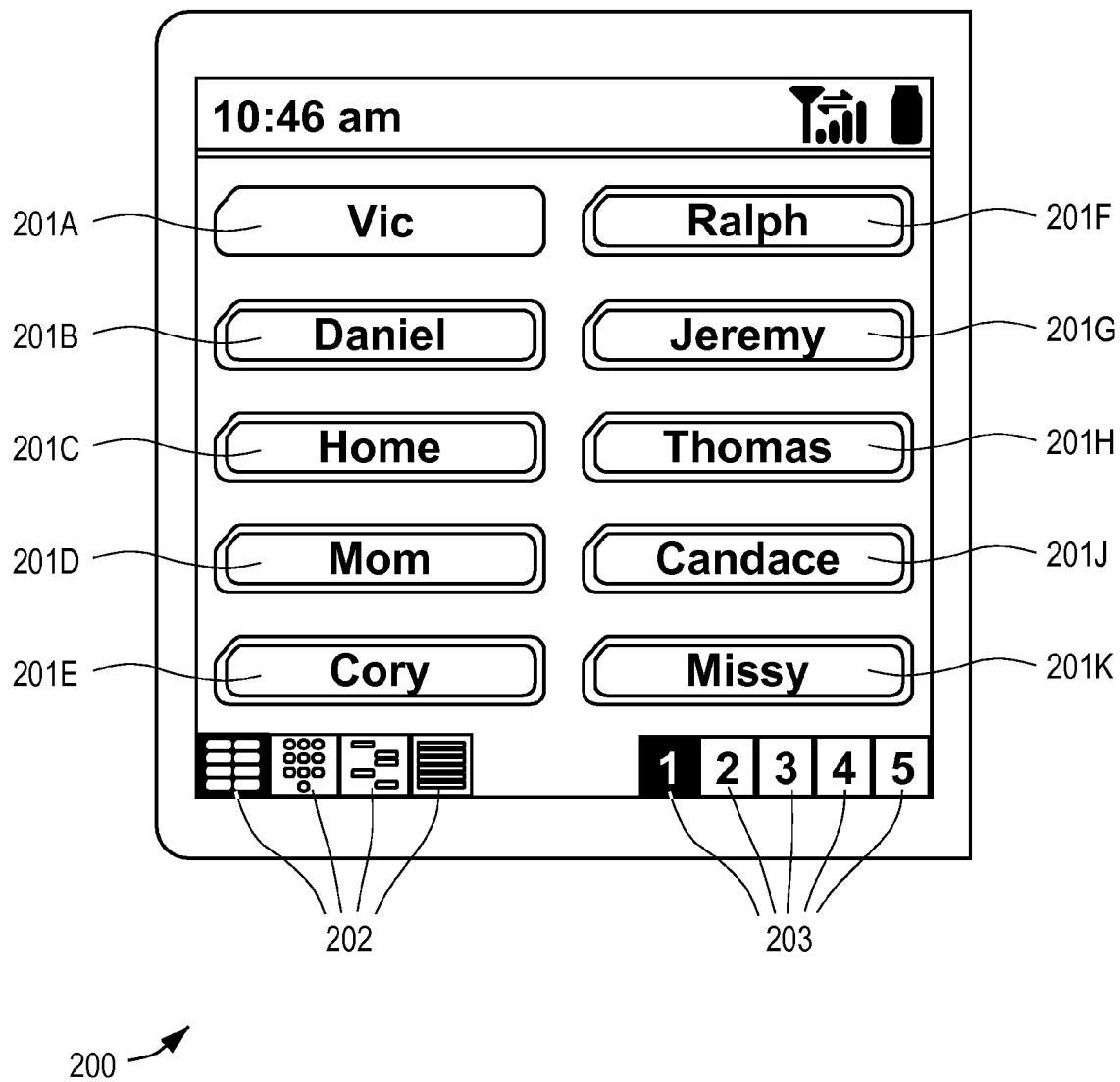
FIG. 2 depicts a user interface display including speed-dial buttons, according to one embodiment.
Figure 4:
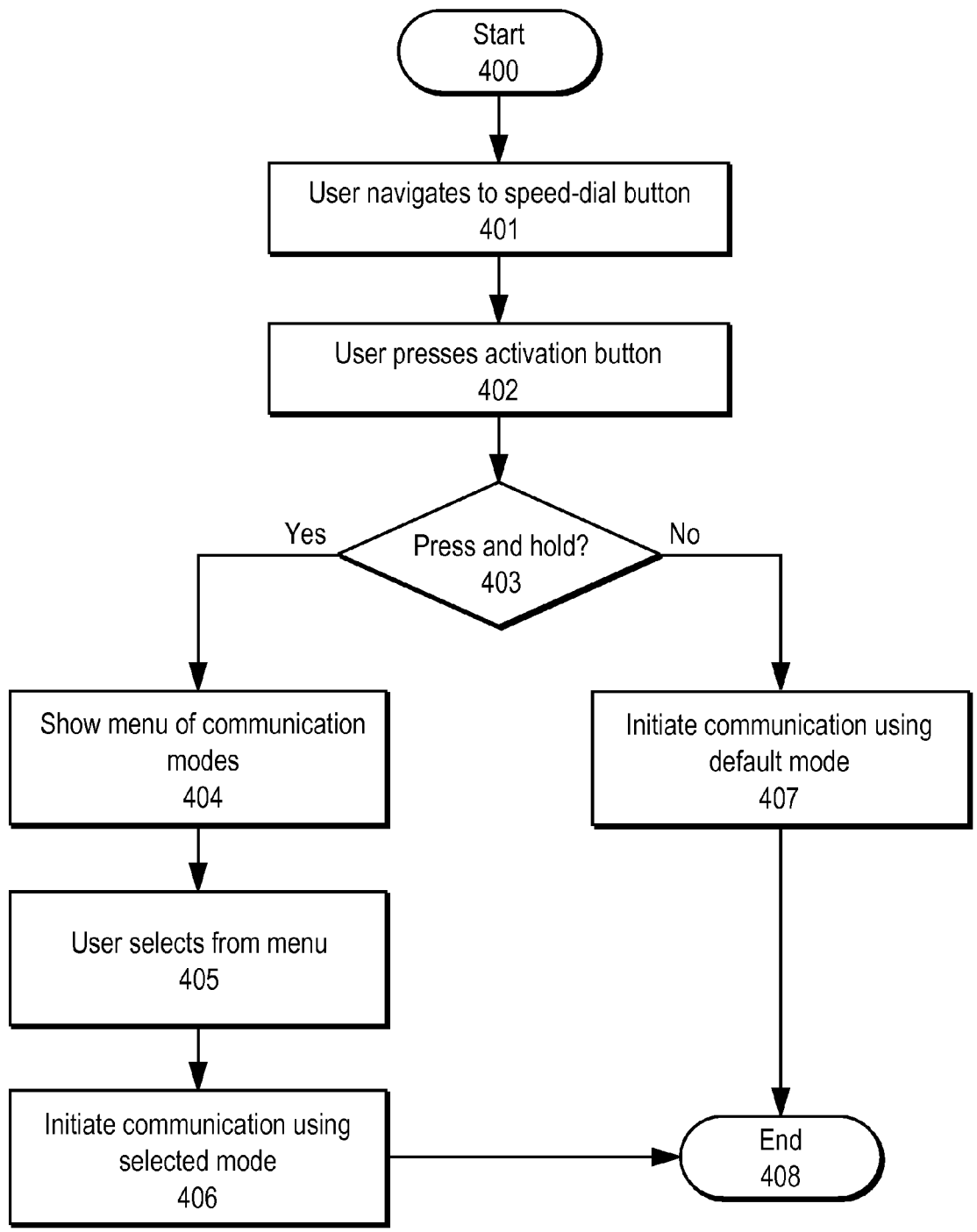
FIG. 4 depicts a flow chart for practicing the present invention according to one embodiment.

Referring now to FIG. 2, there is shown an example of a screen shot 200, as may be displayed on screen 102. Referring also to FIG. 4, there is shown a flow chart depicting an example of a sequence of steps performed according to one embodiment of the invention. Screen shot 200 includes ten speed-dial buttons 201A through 201K. In the example of FIG. 2, such speed-dial buttons 201 are presented as graphic representations of buttons, or "soft" buttons, rather than actual physical buttons. Each button 201 is labeled with a person, company, or other identifying information specifying the party that can be contacted by activating the button 201. For example, activating button 201B, labeled "Daniel", would initiate a communication with Daniel. As is known in the art, the user can generally configure buttons 201 so that they can be used to contact people or companies with whom the user communicates frequently.

Screen shot 200 shows additional user interface elements, such as icons 202 for accessing different views and functions, and icons 203 for accessing additional banks of speed-dial buttons. The particular user interface elements shown in FIG. 2, and the arrangement, design, and appearance of the elements and of the screen shot 200, are merely exemplary and are not to be construed as limiting the scope of the invention.

The user can select and activate a speed-dial button 201 via whatever input facility is provided by device 100. For example, if screen 102 is a touch screen, the user can activate a speed-dial button 201 by touching it with a stylus, finger, or other object. If five-way button 104 or some other input device is provided, the user can select a button 201 by specifying a series of navigation commands 401 via the input device, to move a highlight from one button 201 to another. Once the desired button 201 is highlighted, the user can press an appropriate button (such as activation switch 106) to activate 402 the highlighted button 201. Other mechanisms for selecting a button may be used; for example, a user may use keyboard 101 to input the first letter of the label for the desired button 201.

In the example of FIG. 2, button 201A labeled "Vic" is highlighted, as indicated by shading; one skilled in the art will recognize that any distinctive visual indicator can be used to signify highlighting of a button 201. Once button 201A is highlighted in this manner, if the user presses the activation button (such as activation switch 106), in one embodiment device 100 either initiates communication with Vic, or presents a context-sensitive menu, as described in more detail below.

Figure 3:
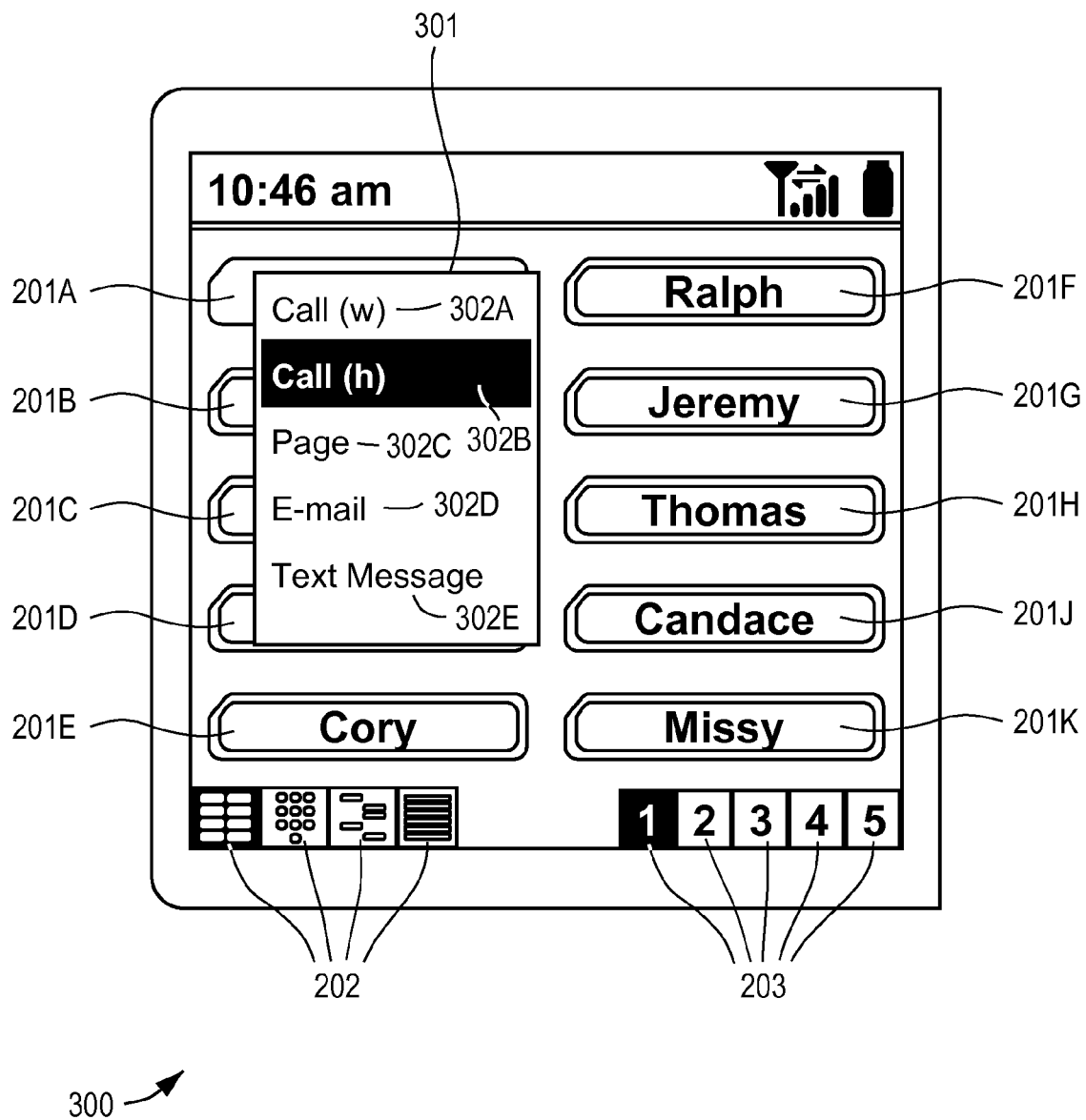
FIG. 3 depicts a user interface display including speed-dial buttons and a context-sensitive menu for selecting a communication mode, according to one embodiment.

Referring now to FIG. 3, there is shown an example of a screen shot 300, as may be displayed on screen 102, including a context-sensitive menu 301. In one embodiment, device 100 displays menu 301 when the user presses a space bar; pressing activation switch 106 initiates contact with the person identified on button 201, using a default communication mode (for example, by dialing the primary telephone number associated with the contact). In another embodiment, device 100 displays menu 301 when the user presses activation switch 106 or otherwise indicates activation of the selected speed-dial button 201. In another embodiment, device 100 determines 403 whether the user intended a simple press (pressing activation switch 106 and releasing it prior to the expiration of a predetermined length of time, such as for example half a second) or a "press and hold" (pressing and holding activation switch 106 for at least the predetermined length of time). If the user intended a "press and hold," device 100 displays 404 menu 301; if the user intended a simple press, device 100 does not display menu 301 but instead initiates communication 407 with the contact corresponding to the selected button 201A, using a default communication mode.

The default communication mode can be preset for all contacts, or it can be specified in advance for each contact. Alternatively, the default communication mode may be the most recently or most frequently used mode for that contact, or the most recently or most frequently used mode overall. In other embodiments, any scheme can be used to distinguish a user command to show menu 301 from a command to simply initiate contact using the default mode. In yet another embodiment, if only one communication mode is available, device 100 does not display menu 301 even when the user presses and holds (or performs whatever action signifies a request that the menu 301 be displayed); instead, device 100 initiates communication using the only available mode. In yet another embodiment, before proceeding, device 100 displays a message requesting that the user confirm his or her desire to initiate communication using the available mode.

One skilled in the art will recognize that many other schemes and methods can be used for determining whether or not to display context-sensitive menu 301. Whichever such scheme is used, in one embodiment menu 301 shows various commands 302 representing available communication modes for contacting the person or company corresponding to the selected button 201A, in this case Vic. In the example of FIG. 3, menu 301 shows five available communication modes: call (w) 302A, which initiates a telephone call to Vic at a work number; call (h) 302B, which initiates a telephone call to Vic at a home number; page 302C, which pages Vic; email 302D, which initiates an email addressed to Vic; text message 302E, which initiates a text message addressed to Vic.

Each menu item 302 corresponds to a communication mode having a defined handle that directs the communication to Vic. For example, for telephone calls the handle is a telephone number, whereas for emails it is an email address. In one embodiment, the handle is displayed in menu 301 in addition to or instead of the words describing the communication mode (thus, for example, the actual telephone numbers and/or email address could be displayed in addition to or instead of the words "call" and "email"). In another embodiment, the handle is displayed when the user makes a selection from menu 301, or when the user presses a button or otherwise requests that the handle be displayed. In yet another embodiment, device 100 is configurable so as to allow the user to specify whether and how handles should be displayed in menu 301.

The order in which menu items 302 are presented may depend upon relative frequency of use for the corresponding communication modes, either overall or with respect to the particular contact. Alternatively, menu items 302 may be presented in a predefined order or a user-configurable order.

In one embodiment, the user can select 405 a desired communication mode by using button 104 (or a similar button) to navigate within menu 301. As is common in menu navigation in computer systems, the user presses a "down" button (such as the lower portion of button 104) to select the next item 302 in menu 301. The user presses an "up" button (such as the upper portion of button 104) to select the previous item 302. When the beginning or end (top or bottom) of menu 301 is reached, further button presses in the same direction may be ignored, or alternatively they may cause the selection to wrap to the other end of menu 301. In one embodiment, the user may cancel the communication operation and dismiss menu 301 by pressing a Cancel button or other switch, or by selecting a Cancel menu item (not shown), or by some other mechanism. In another embodiment, menu 301 may automatically be dismissed after a period of inactivity.

In one embodiment, device 100 indicates the selected item by highlighting it. For example, as shown in FIG. 3, inverse coloring is used for item 302B to show that it is currently selected. Any technique can be used for distinguishing the currently selected item 302 from other items 302 in menu 301.

When the user presses activation switch 106, device 100 dismisses menu 301 and initiates 406 communication according to the mode specified by the item 302 that was selected at the time of activation.

In other embodiments, device 100 may employ other schemes for selecting a communication mode from menu 301. For example, if screen 102 is touch-sensitive, a user may select a mode by touching the corresponding menu item 302 with a stylus, finger, or other object.

In one embodiment, device 100 includes in menu 301 all available communication modes for the contact corresponding to the selected speed-dial button 201. Information describing the available communication modes may be stored in a single record associated with the speed-dial button 201, so that device 100 retrieves the information from the record and constructs menu 301 using the retrieved information.

In another embodiment, device 100 searches for additional records that correspond to the selected contact, in addition to the record corresponding to the selected speed-dial button 201. For example, if separate records are stored for the contact's home phone number and work number, a particular speed-dial button 201 may be associated with only one of the two records. In such a situation, device 100 identifies the other record as being associated with the same contact (for example, by performing a reverse lookup by comparing the person's name in the two records). Device 100 then includes menu items 302 in menu 301 representing each of the communication modes, even though the modes correspond to different contact records. Thus, the present invention provides a mechanism for providing unified and simplified access to various communication modes, even when the contact information for the modes is stored separately.

Thus, when alternate mode lookup is initiated, device 100 searches for contact records that include the telephone number (or other handle) associated with the selected speed-dial button 201. In one embodiment, the search accounts for differences in formatting, and removes any area code or prefix information from the search terms so as to facilitate correct matching even if there are differences in the way the contact information was entered.

The present invention can also be implemented in connection with online lookup of contact information. Thus, when performing the reverse lookup, device 100 might search the Internet, or any other resource, for alternate contact modes corresponding to the supplied handle. For example, if the speed-dial button 201 is associated with a telephone number, device 100 can perform a reverse lookup on that telephone number via an Internet resource such as "www.google.com", and then look for alternate contact modes for the person associated with the telephone number. Menu 301 can then be presented, including the alternate contact modes that were discovered via the Internet resource. If desired, the alternate contact information can also be added to local address book on device 100.

In one embodiment, suffixes are appended to menu 301 entries 302 (such as "(w)" and "(h)", as shown in FIG. 3), to indicate work or home, or other specifier as to the nature of the contact mode.

In one embodiment, the invention operates in connection with speed-dial buttons 201 that can be configured to activate other functions besides initiating communication. For example, in a device 100 that can store documents, buttons 201 might be used to access or open frequently used documents. Alternatively, buttons 201 might be associated with particular applications or functions. In such an embodiment, the functionality of the present invention may be extended to provide access to auxiliary commands and functions with respect to the item represented by a particular button 201. Thus, if a user clicks and holds a button 201, the invention displays a context-sensitive menu showing various commands and functions applicable to the item associated with the selected button 201. Accordingly, the functionality of the present invention can be extended beyond mechanisms for initiating various forms of communication.

As discussed above, the present invention is not limited to a device resembling the particular wireless communication device 100 depicted and described above in connection with FIG. 1. In particular, the invention may be implemented in other types of devices and using other types of input and output mechanisms. In addition, the menu 301 display described above is merely exemplary of one technique for implementing the invention. In an alternative embodiment, the invention could be implemented using a technique in which only one selectable mode is shown at a time; the user can press a button to cycle among available modes until the desired mode is displayed. The user can then press an activation button to initiate communication using the displayed mode. Such a technique is particularly useful in a device having a limited display, such as a single-line display.

In addition, the above-described techniques can be used in connection with any type of information or communication mode associated with a contact, including, for example, SMS addresses or handles, email addresses, presence information, and the like.

In one embodiment, the above-described techniques are implemented in other contexts where some form of communication is about to be initiated. For example, if a user manually dials a telephone number, he or she can initiate an alternate contact mode lookup to see other contact modes for the person corresponding to that telephone number. Thus, after dialing the number, if the user hits the space bar (or performs whatever other action initiates the alternate contact mode lookup), a pop-up menu is presented that allows the user to select among other contact modes. As described above, the entries in the pop-up menu can be generated on the fly by performing a reverse lookup on the entered telephone number to find a record in the address book that corresponds to the telephone number, and then building the pop-up menu from other contact information in that record. Similar mechanisms can be applied for any situation where a user enters or selects a contact handle and then initiates alternate contact mode lookup.

Figure 5:
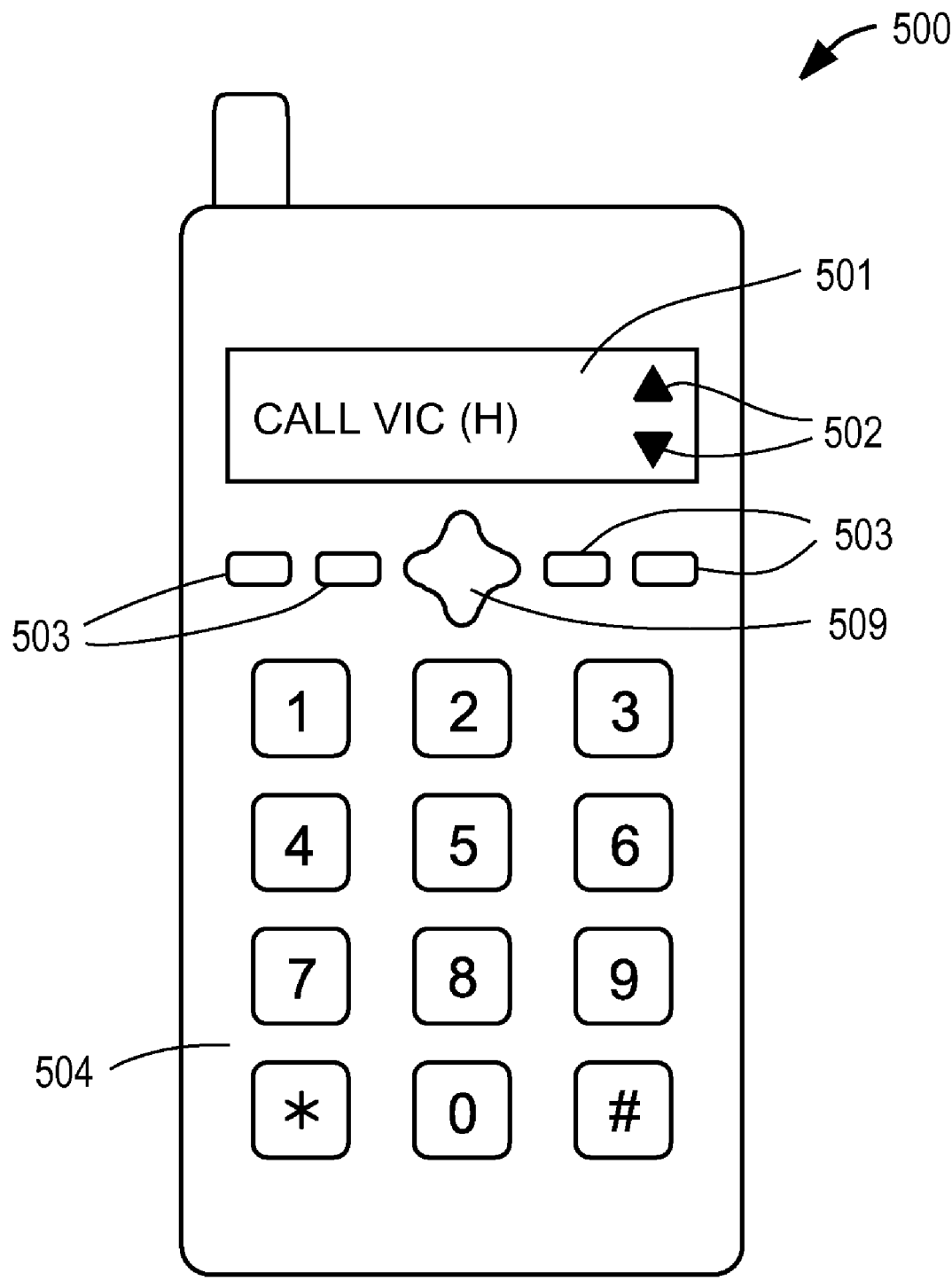
FIG. 5 depicts a cellular telephone for implementing one embodiment using physical speed-dial buttons.

Referring now to FIG. 5, there is shown an alternative embodiment of the invention as implemented on a device 500 having physical speed-dial buttons 503 rather than "soft" buttons presented on a display. Device 500 is depicted as a cellular telephone having four speed-dial buttons 503, numeric keypad 504, activation button 509, and a one-line display 501. In such an implementation, one mechanism for initiating the steps of the present invention might be for the user to press and hold a speed-dial button 503. Device 500 would then display one of the available communication modes on display screen 501. Arrows 502 indicate that other modes are available. In one embodiment, the user can select other modes by repeatedly pressing the speed-dial button 503 to cause device 500 to display successive modes that are available for the selected contact. Once the desired mode is displayed, the user can press activation button 509 to initiate communication. In an alternative embodiment, a five-way button, as described above, can be provided for navigation among available modes and selection of a desired mode.

Presence Information in Speed-Dial Buttons

In one embodiment, speed-dial buttons 201 such as those shown in FIG. 2 are configured to indicate presence information for the individual associated with each button 201. Thus, for example, button 201 indicates whether the person is online, on the phone, busy, in a meeting, or the like. Such information can be presented in any visually recognizable way, such as for example via color-coding of button 201, or via an icon within or adjacent to button 201, or by a pop-up indicator that is displayed when button 201 is selected or activated. In addition to or instead of such a visual indicator, an auditory indicator can be provided; for example, a distinctive tone or beep may sound when button 201 is highlighted or activated, to indicate that the individual is busy (or to indicate any other presence information for the individual).

Presence information can be obtained by any of several well known mechanisms, such as for example: by receiving periodic updates of the individual's current state; by polling the individual's cell phone or other communication device; or by checking with a central repository of such information. Presence information can be obtained on a periodic basis, or it can be obtained on-the-fly when needed (such as when a button 201 is activated or highlighted). Presence information can be stored locally, on a temporary basis, so that it need not be sought or retrieved each time a button 201 is activated or highlighted; in such an implementation, presence information can be configured to "expire" after a predetermined period of time, so as to avoid the display of outdated data.

Also, one skilled in the art will recognize that such presence information can be displayed or made available in contexts other than speed-dial buttons 201. For example, when a telephone number is manually entered, but before the user hits the "send" button, in one embodiment device 100 might indicate (via visual and/or auditory means) that the individual associated with that telephone number is busy or not taking calls, or that he or she is (or is not) online, or the like. Also, presence information can be displayed in a phone directory view, with (for example), an icon adjacent to each entry in the telephone directory to indicate current presence information.

Figure 14:
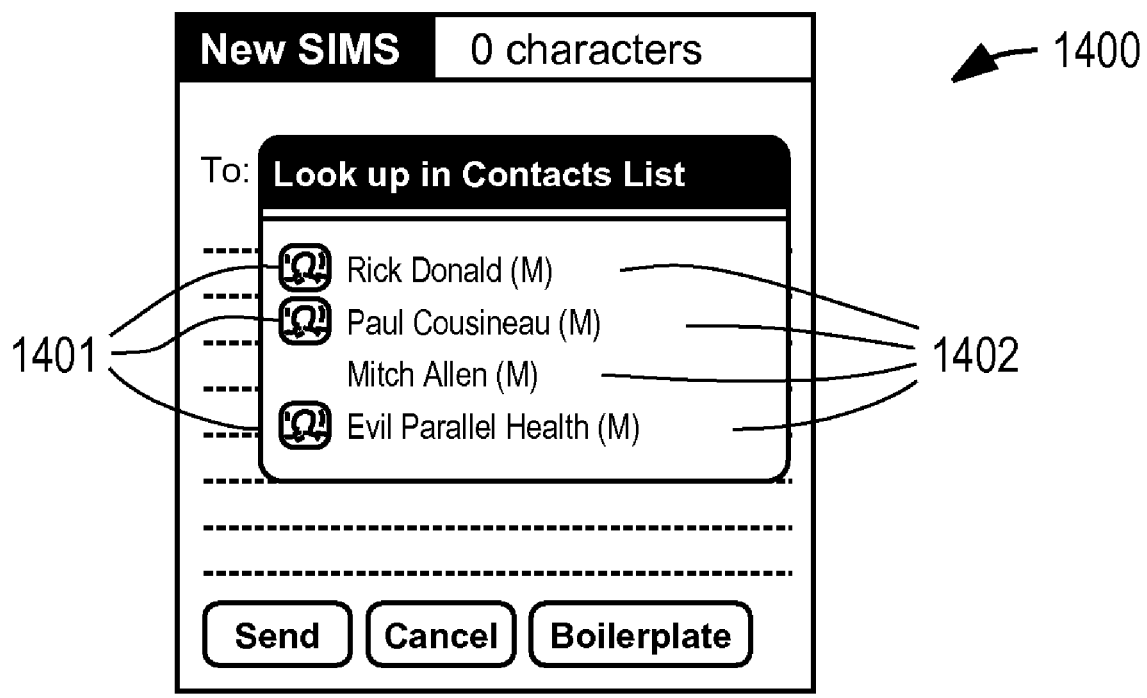
FIG. 14 depicts a screen including presence indicators for contacts.
Figure 15:
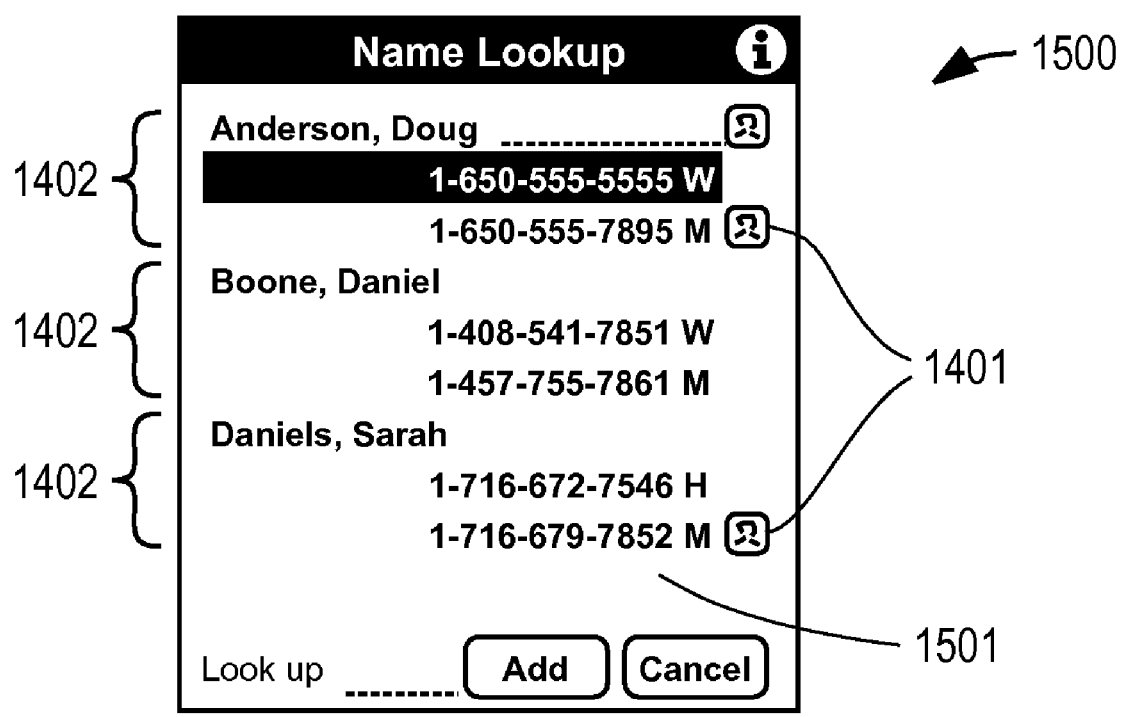
FIG. 15 depicts a screen including presence indicators for contacts in a lookup list.

Referring now to FIG. 14, there is shown a screen 1400 including presence indicators 1401 for contacts 1402. Referring now to FIG. 15, there is shown a screen 1500 including presence indicators 1401 for contacts 1402 in a lookup list 1501.

Redial List

In one embodiment, a pop-up redial list is provided. A pop-up menu including a redial list is activated when the user presses the activation switch (center button) 106 of five-way button 104. In alternative embodiments, the pop-up menu may be activated in response to other user action or events.

Figure 6A:
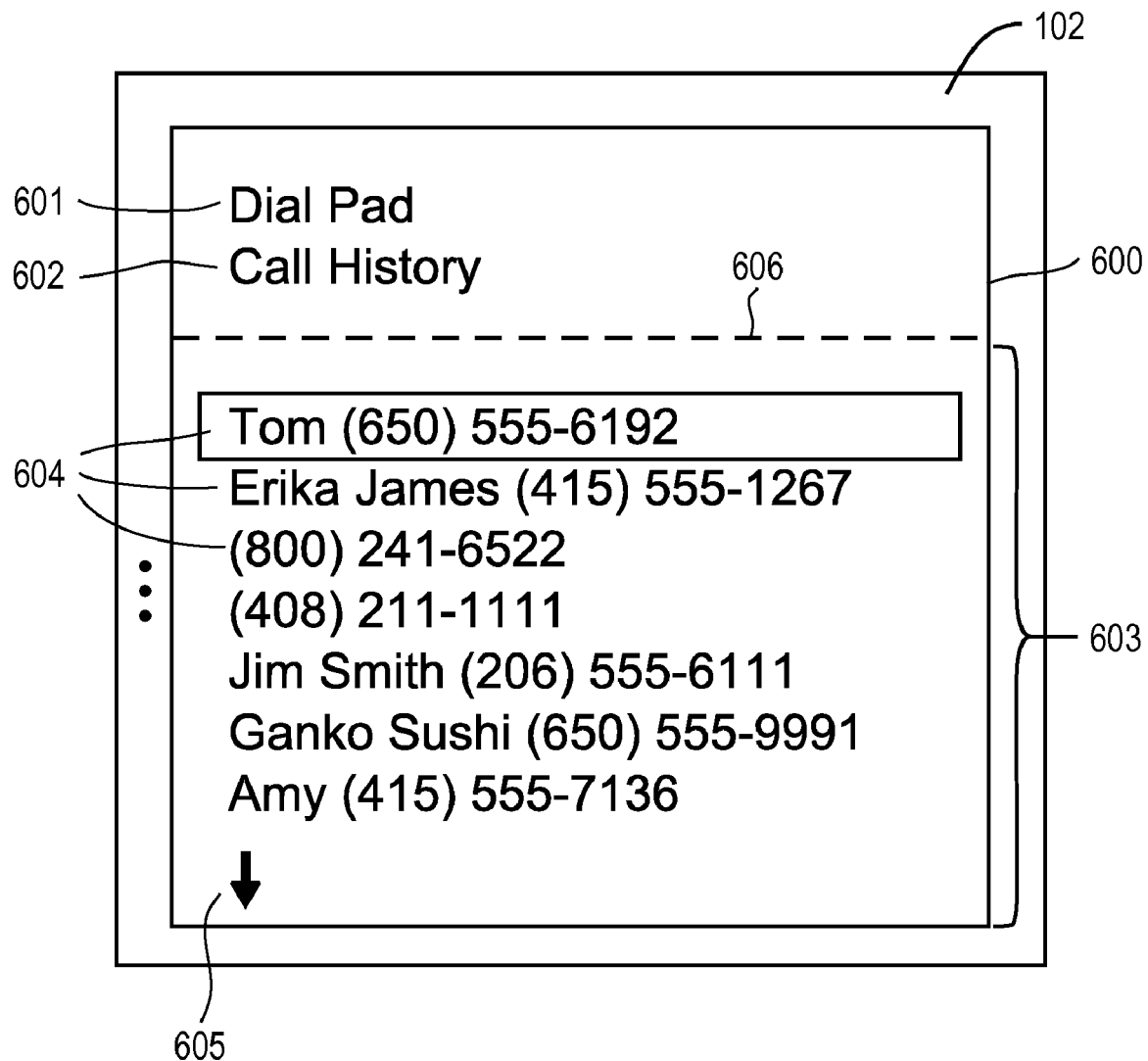
FIG. 6A depicts a user interface for a redial list, according to one embodiment.

Referring now to FIG. 6A, there is shown an example of a pop-up menu 600 including a redial list 603, as it is displayed on screen 102 according to one embodiment.

Pop-up redial list 603 is a list of the most recently dialed telephone numbers 604. In one embodiment, up to ten telephone numbers 604 are shown. If insufficient screen space is available, list 603 can be scrollable, so that the user can see the remaining numbers by, for example, tapping an icon 605 or other indicator near the bottom of menu 600. If a dialed number matches a name in the address book, the name is displayed along with or instead of the number in pop-up redial list 603.

In one embodiment, pop-up menu 600 is dismissed if the user taps anywhere on screen 102 outside menu 600. Tapping on a name or number 604 within menu 600 causes that telephone number to be dialed. The user can also navigate within menu 600 by using the up and down buttons on five-way button 104, or via other navigational schemes. The activation switch 106 on five-way button 104 causes currently highlighted telephone number 604 to be dialed, and also causes menu 600 to be dismissed.

If there are no numbers to be displayed (either because no calls have been made recently, or because the list of calls has been purged or the device has been reset), a message indicating "No Recent Calls" is shown. In one embodiment, only those numbers corresponding to calls made within a predetermined time period (such as, for example, within the last five days) are displayed.

In one embodiment, the first item in menu 600 is a "Dial Pad" command 601. Selecting item 601 causes a standard dial pad to be displayed, allowing a user to manually enter a telephone number to be dialed.

In one embodiment, the second item in menu 600 is a "Call Log" command 602. Selecting item 602 causes a complete call log to be displayed.

In one embodiment, a separator line 606 appears between "Call Log" command 602 and redial list 603. Separator line 606 never receives focus. Thus, when the user presses "up" or "down" to highlight various items on menu 600, separator line 606 is skipped over.

Other arrangements for pop-up menu 600 are possible. In one embodiment, individual carriers can select from a number of options; alternatively, a user can select an option via a configuration screen. For example:

Dial Pad; Separator line; Redial List
Call Log; Dial Pad Separator line; Redial List
Dial Pad; Call Log Separator line; Redial List In one embodiment, redial list 603 is arranged in reverse chronological order. The most recently dialed number 604 appears first and is initially highlighted (i.e., receives initial focus) when redial menu 600 appears. Thus, the user can simply hit the activation switch 106 two times successively to perform a "last number redial" operation: the first action causes menu 600 (including redial list 603) to be displayed, with the most recently dialed number 600 highlighted; the second action causes that highlighted number 604 to be dialed. In the example of FIG. 6A, the first telephone number 604 listed is "Tom (650) 555-6192". Any known technique for highlighting can be used, including for example outlining, inverse coloring, bold text, differently colored text, or the like.

In one embodiment, each number 604 appears only once in redial list 603. If a number 604 was dialed more than once, it only appears once (sorted with other items according to the most recent call to that number). For example, if the fifth number 604 is dialed again, it moves to the first position and is removed from the fifth position.

In one embodiment, redial list 603 includes numbers 604 (and/or names) for received calls and/or missed calls as well. These can be displayed separately, or simply sorted along with numbers 604 for outgoing calls in chronological order. Thus, the user can use menu 600 to return a call as well as to redial a previously dialed number.

Figure 6B:
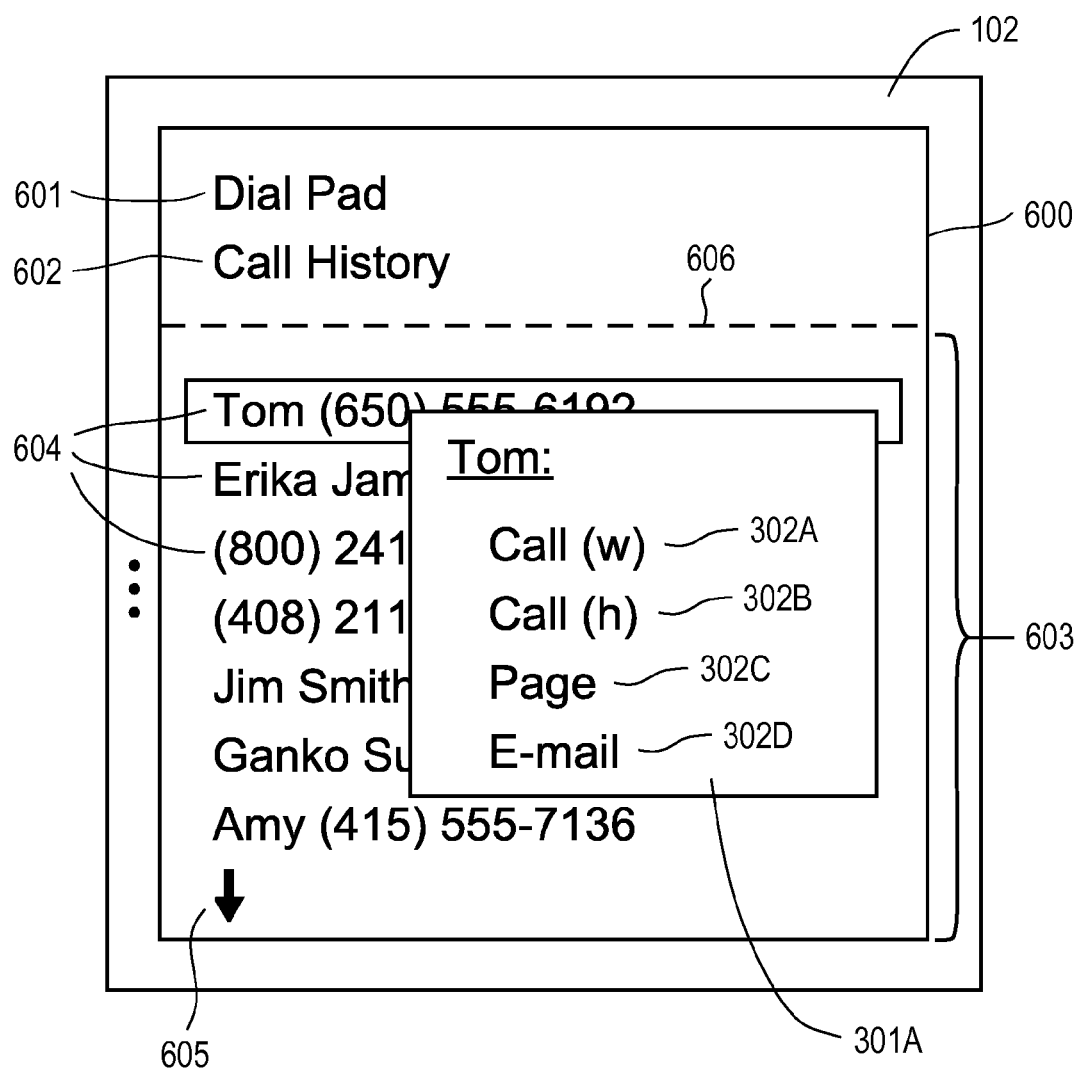
FIG. 6B depicts a user interface including alternate communication modes for a redial list, according to one embodiment.

In one embodiment, redial list 603 functionality can be combined with the above-described techniques for providing alternate contact modes. Thus, for each number 604 on redial list 603, device 100 can do a reverse look-up to determine whether any alternate contact modes exist for the contact associated with that number 604. For example, if an email address, alternate telephone number, or the like, is available, device 100 can display those alternate contact modes. Referring now to FIG. 6B, there is shown an embodiment in which alternate contact modes are displayed in a sub-menu 301A (similar to menu 301 of FIG. 3), for example after number 604 has been selected for a predetermined period of time. Sub-menu 301A contains alternate modes 302A through 302D for contacting the selected contact 604 in main menu 600. Alternatively, the user can click a button (such as one of the directions of five-way button 104, or spacebar in keyboard 101, or any other control), to cause sub-menu 301A to be displayed. The user can use five-way button 104 to navigate within menu 301A in order to highlight an alternate contact mode 302, and can then press activation switch 106 to activate that contact mode 302. The user can dismiss sub-menu 301A to return to main menu 600, for example by pressing a "cancel button", or by tapping on screen 102 outside menu 301A, or by pressing the spacebar or whatever key was used to activate sub-menu 301A.

One skilled in the art will recognize that the arrangement shown in FIG. 6B is merely exemplary, and that other techniques of displaying alternate contact modes can be used.

Favorites Buttons

In one embodiment of the present invention, the speed-dial buttons of the present invention provide improved functionality for accessing favorite features, including for example launching applications, dialing numbers, sending pre-addressed Short Message Service (SMS) messages, and browsing saved Uniform Resource Locators (URLs). In the context of describing such functionality, these buttons are referred to herein as "favorites", since they provide functionality for accessing any feature, command, or option that the user designates as a favorite. One skilled in the art will recognize that the terms "speed-dial button" and "favorites button" can be used interchangeably, and that both terms refer to any user-assignable button.

Figure 7:
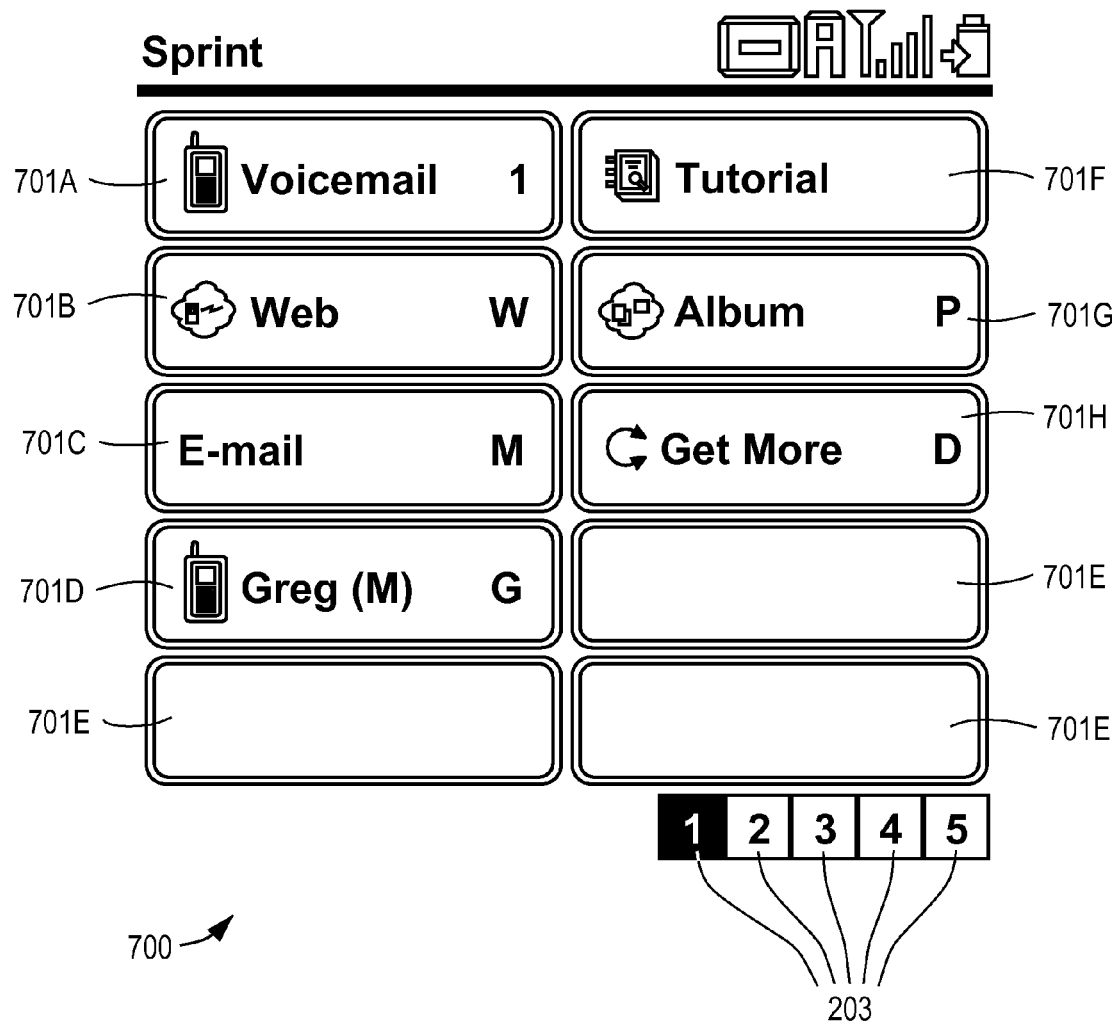
FIG. 7 depicts a user interface display including favorites buttons, according to one embodiment.

Referring now to FIG. 7, there is shown a user interface display 700 including favorites buttons 701A through 701H, according to one embodiment of the present invention. Favorites buttons 701A through 701D and 701F through 701H are assigned to various functions, such as checking voicemail, surfing the web, checking email, dialing a particular telephone number, and the like. Buttons 701E are currently unassigned, although the user can assign them if he or she wishes. Text and/or icons indicate the function associated with each button 701. In addition, for some buttons, a letter is shown to indicate that the corresponding functionality can also be activated by pressing and holding that letter from QWERTY keyboard 101 of the device. The user can assign and/or configure the text, icons, and keyboard shortcuts as desired.

User interface display 700 also includes icons 203 for accessing additional banks of favorites buttons 701. In one embodiment, five banks of favorites buttons 701 are available, for a total of fifty buttons 701.

The user can assign each button 701 to any of several different functions. Such functions include, without limitation:

Dialing a telephone number;
Emailing a particular recipient;
Launching an application (possibly with one or more parameters, such as a destination, URL, date, or the like, already filled in); and
Initiating entry of a text message to a particular recipient.

In one embodiment, each button 701 can be in one of a number of states. States can be indicated by color or by some other visual attribute. Button 701 states include, for example:

Standard;
Depressed (while the user is pressing button 701);
Focus (while button 701 has focus);
Empty (unassigned); and
Empty depressed.

In one embodiment, a user can assign a favorites button 701, or edit characteristics of a favorites button 701 (such as the text label, keyboard shortcut, or the like), by selecting an "Edit Favorites Button" from an onscreen menu (not shown), or by activating a keyboard command. The user is then presented with a dialog box for performing button 701 configuration and/or editing.

In one embodiment, a user can rearrange buttons 701 by dragging the button 701 from one location to another, or by selecting a command for rearranging or configuring button 701 pages.

In one embodiment, the user can navigate among favorites buttons 701 as follows. Initially, the first (top-left) button 701 has focus when display 700 is presented. The user can navigate using the up/down/left/right controls on five-way button 104, and can activate the button 701 that currently has focus by pressing activation switch 106, or by hitting an activation key, such as Enter button, Return button, or space bar on keyboard 101. In one embodiment, pressing space bar on keyboard 101 activates a display of alternate ways to contact a person corresponding to the button 701 that currently has focus, as described in more detail in another section of the present application.

In one embodiment, the following special situations apply:
If the top-left button 701 has focus, and the user hits the up button, the previous bank is displayed, and the last assigned button 701 in that bank is given focus. If bank #1 was already being displayed, nothing happens (alternatively, the last bank containing an assigned button is displayed, and the last assigned button 701 is given focus).
If the bottom-left button 701 has focus, and the user hits the down button, the top-right button 701 is given focus.
If the top-right button 701 has focus, and the user hits the up button, the bottom-left button 701 is given focus.
If the top-left button 701 has focus, and the user hits the down button, the top-right button 701F is given focus.
If the bottom-right button 701 has focus, and the user hits the down button, the next bank is displayed, and the first assigned button 701 in that bank is given focus. If the last bank containing an assigned button was already being displayed, nothing happens (alternatively, the first bank is displayed, and the top-left button 701 is given focus).
If any of the left-side buttons 701 has focus, and the user hits the left button, the previous bank is displayed, and the right-side button 701 at the same vertical position in the previous bank is given focus. If bank #1 was already being displayed, nothing happens (alternatively, the last bank containing an assigned button is displayed, and the right-side button 701 at the same vertical position in the previous bank is given focus).
If any of the right-side buttons 701 has focus, and the user hits the right button, the next bank is displayed, and the left-side button 701 at the same vertical position in the next bank is given focus. If the last bank containing an assigned button was already being displayed, nothing happens (alternatively, the first bank is displayed, and the left-side button 701 at the same vertical position in the first bank is given focus).

One skilled in the art will recognize that different special conditions and handling can be applied without departing from the essential characteristics of the present invention. In particular, for embodiments having different numbers and/or arrangements of buttons 701, different special conditions and handling may be appropriate.

The user can also activate any button 701 by tapping on it with a stylus or finger. Pressing and holding the up, down, left, or right control on five-way button 104 causes the navigation command corresponding to the button to repeat. Pressing and holding activation switch 106 activates a display of alternate ways to contact a person corresponding to the button 701 that currently has focus, as described in more detail in another section of the present application.

Pressing and holding a key in QWERTY keyboard 101, when the key's character has been associated with a favorites button 702, activates the action associated with the favorites button 702. In one embodiment, activation in this manner can take place whether or not the bank containing the associated favorites button 702 is currently being displayed. In one embodiment, activation in this manner only takes place from certain states, such as a Main Default View, a Favorites View, and a Dial Pad View. The state of modifier keys (such as shift and option keys) is ignored.

The particular user interface elements shown in FIG. 7, and the arrangement, design, and appearance of the elements and of user interface display 700, are merely exemplary and are not to be construed as limiting the scope of the invention.

In one embodiment, several types of commands, features, and/or actions can be assigned to favorites buttons 701. Examples include:

Applications. Launches an application associated with favorites button 701.
URLs. Launches a browser application and navigates to the associated URL.
SMS addresses. Launches a text messaging application in a Compose New Message view, with an address associated with button 701 inserted automatically into the To: field.
Speed Dials. Dials a telephone number associated with button 701.

In one embodiment, if the user deletes an application, but not the associated favorites button 701, the device displays an error message when the user attempts to activate the favorites button 701. At that time, the user will be given an option to unassign the favorites button 701. Alternatively, such an option may be presented to the user when the application is deleted.

In one embodiment, a carrier can specify a default set of favorites buttons 701; devices distributed by or on behalf of that carrier will initially be configured with the default set. The carrier can also specify that a given favorites button 701 be locked so that it cannot be modified, reconfigured, or moved by the user.

In one embodiment, different icons are used to indicate different types of actions associated with buttons 701, so as to ensure that the user is aware of what action will take place when a particular button 701 is activated. For example, for functions such as SMS, emailing, or browsing, an icon representing the associated application (messaging application, email application, or browser) appears within button 701. Speed Dial buttons 701 include a mobile phone icon. Alternatively, different types of buttons 701 can be distinguished by color-coding, text labels, pop-up labels, distinctive shape or outline, or by some other visual indicator.

Figure 8:
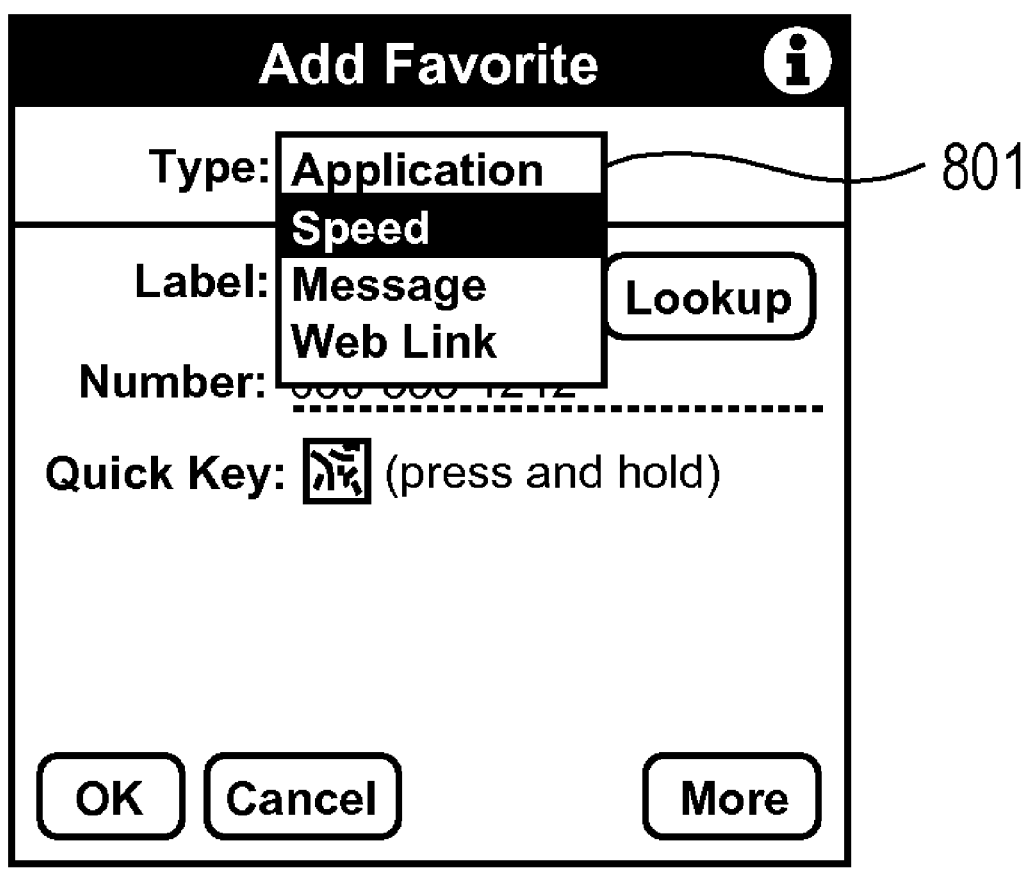
FIG. 8 depicts an initial screen for assigning a favorites button, according to one embodiment.

FIGS. 8 through 12B show examples of screens for assigning, editing, and configuring favorites buttons 701 according to one embodiment. Referring now to FIG. 8, there is shown an initial screen 800 for assigning a favorites button 701. Screen 800 might be presented, for example, when user presses activation button 106 while an unassigned favorites button 701 has focus, or when a user activates an "assign favorites button" command. The user can select, from menu 801, the type of action to be associated with button 701, including for example: application; speed dial; message; or web link.

Figure 9A:
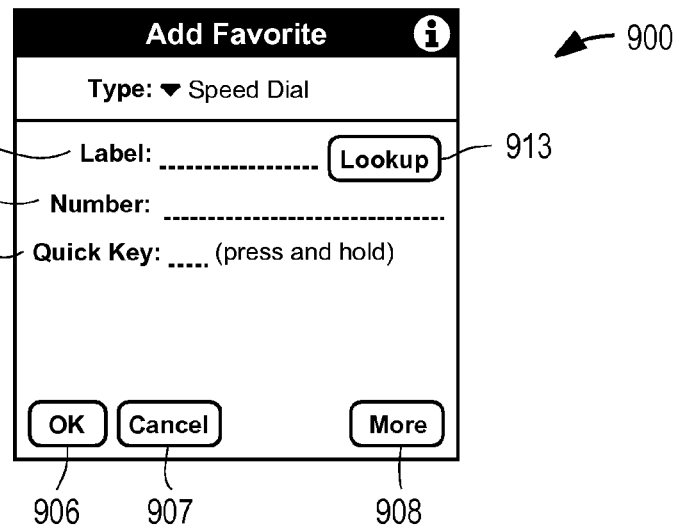
FIGS. 9A through 9C depict screens for configuring a favorites button as a speed dial button, according to one embodiment.
Figure 9B:
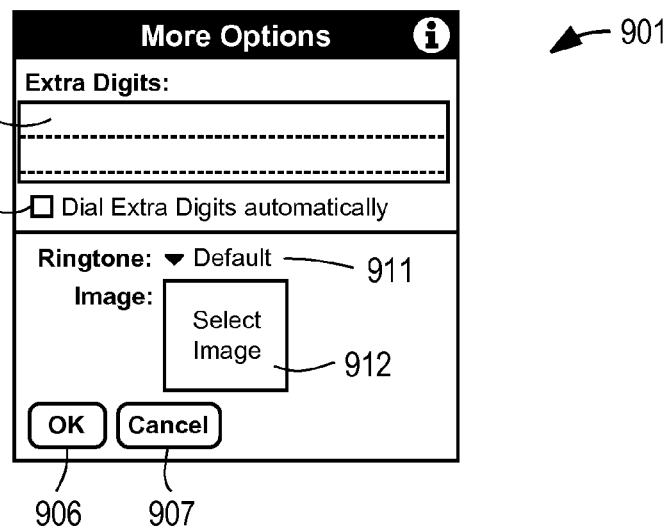
Figure 9C:
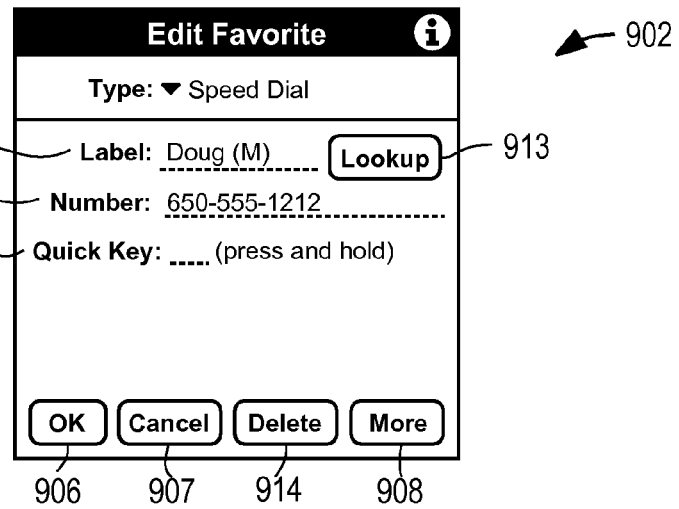

Referring now to FIGS. 9A through 9C, there is shown a series of screens 900, 901, 902 for configuring a favorites button 701 as a speed dial button. Screen 900 allows a user to specify, in field 903, a label (such as text) for button 701. The user can also specify a telephone number in field 904, and a keyboard shortcut in field 905. If the user selects a keyboard shortcut that is already in use, the device can inform the user of the conflict and ask that the user provide a different keyboard shortcut. If the user selects an invalid keyboard shortcut key (such as a non-alphanumeric key), an alert, such as an audible beep, can be provided. OK button 906 dismisses screen 900 and accepts the user's entries and configures button 701 accordingly. The user is returned to the favorites view, with the newly-added or edited button 701 having focus. Cancel button 907 cancels the configuration operation. More button 908 accesses screen 901. Lookup button 913 displays a dialog box for looking up numbers from the user's address book.

Screen 901 allows the user to specify, in field 909, any extra digits (such as an extension number) to be dialed after the telephone number is dialed. The user can indicate, via checkbox 910, whether the extra digits are to be dialed automatically (for example, after a two-second pause) or only when the user indicates that they should be dialed. The user can enter special characters, such as ",", "p", or "w", to indicate onesecond pause, three-second pause, or wait (i.e., the device should wait for user action before proceeding with the digits that follow). Ringtone selector 911 allows the user to select a special ringtone that will sound when a call is received from this telephone number. Image selector 912 allows the user to select an image to be displayed when a call is received from this telephone number.

If the user activates a favorites button 701 and the specified phone number does not include the appropriate "1" or "1+area code" prefix, appropriate prefixes are automatically pre-pended according to previously specified dial preferences.

Screen 902 provides functionality for editing a favorites button 701 that has previously been assigned. Screen 902 is similar to screen 900, but also includes Delete button 914, which causes favorites button 701 to be unassigned. In one embodiment, a confirmation dialog box is presented before the delete action takes effect.

A button 701 can be configured as a voicemail button. Thus button 701 may have a carrier-customizable label. The shortcut key assignment can be hard-coded, for example to the number "1". The voicemail button can also be configured so that it cannot be renamed or deleted.

Figure 10:
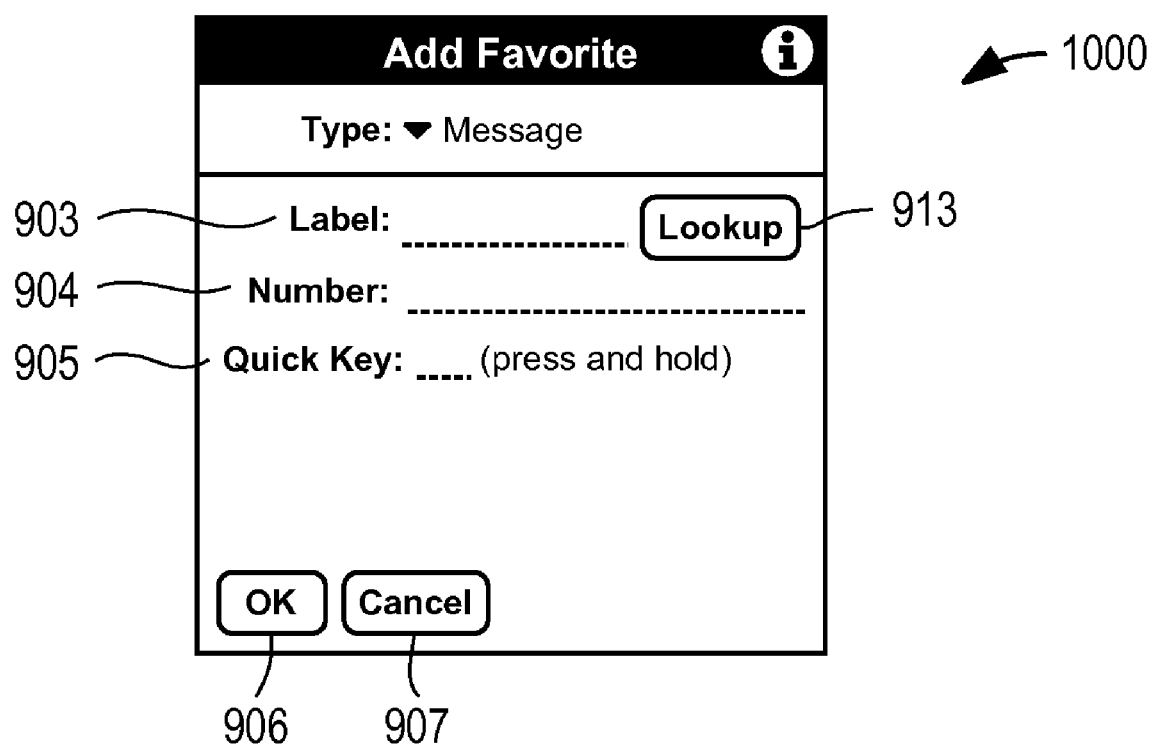
FIG. 10 depicts a screen for configuring a favorites button as a message (SMS) button, according to one embodiment.

Referring now to FIG. 10, there is shown a screen 1000 for configuring a favorites button 701 as a message (SMS) button. Screen 1000 allows a user to specify, in field 903, a label (such as text) for button 701. The user can also specify a telephone number in field 904, and a keyboard shortcut in field 905. If the user selects a keyboard shortcut that is already in use, the device can inform the user of the conflict and ask that the user provide a different keyboard shortcut. If the user selects an invalid keyboard shortcut key (such as a non-alphanumeric key), an alert, such as an audible beep, can be provided. OK button 906 dismisses screen 900 and accepts the user's entries and configures button 701 accordingly. The user is returned to the favorites view, with the newly-added or edited button 701 having focus. Cancel button 907 cancels the configuration operation. Lookup button 913 displays a dialog box for looking up numbers from the user's address book.

Figure 11A:
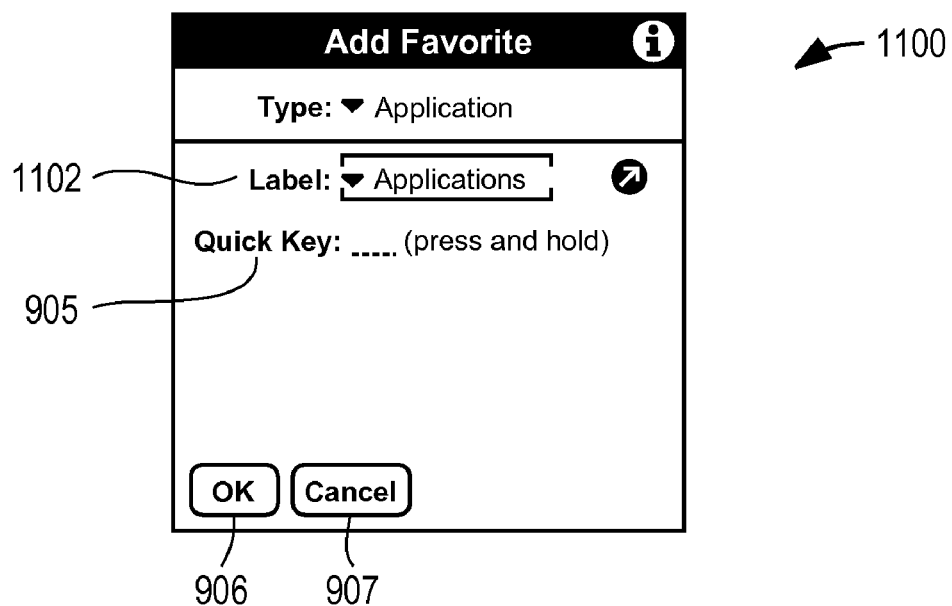
FIGS. 11A and 11B depict screens for configuring a favorites button as an application button, according to one embodiment.
Figure 11B:
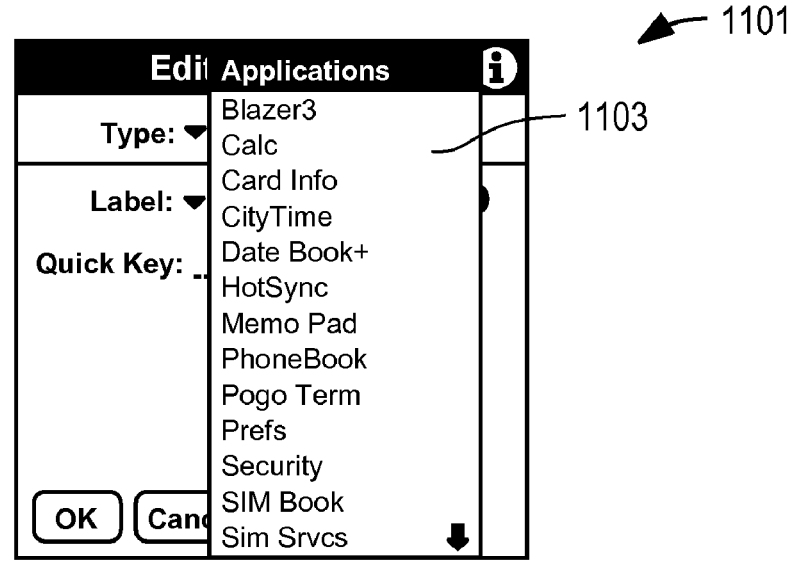

Referring now to FIGS. 11A and 11B, there are shown screens 1100 and 1101 for configuring a favorites button 701 as an application button. Screen 1100 allows a user to specify, via menu bar 1102, a label (such as text) for button 701. When activated, menu bar 1102 is replaced by pop-up menu 1103 showing available applications that can be assigned to button 701. Long application names may be truncated, with ellipses to indicate the truncation. The user can select from the applications shown in menu 1103. The user can also specify a keyboard shortcut in field 905. If the user selects a keyboard shortcut that is already in use, the device can inform the user of the conflict and ask that the user provide a different keyboard shortcut. If the user selects an invalid keyboard shortcut key (such as a non-alphanumeric key), an alert, such as an audible beep, can be provided. OK button 906 dismisses screen 900 and accepts the user's entries and configures button 701 accordingly. The user is returned to the favorites view, with the newly-added or edited button 701 having focus. Cancel button 907 cancels the configuration operation.

Figure 12A:
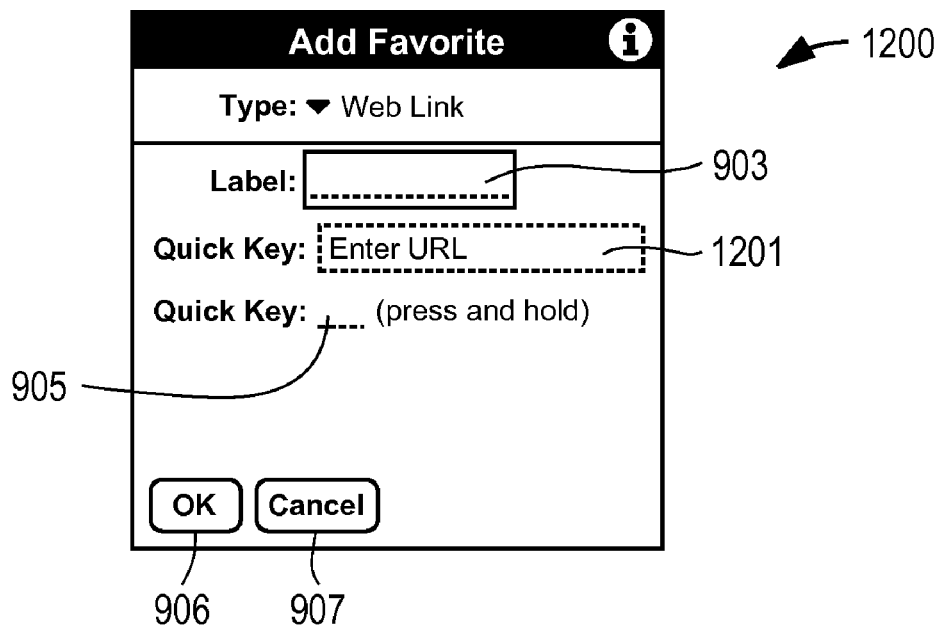
FIGS. 12A and 12B depict screens for configuring a favorites button as a web link button, according to one embodiment.
Figure 12B:
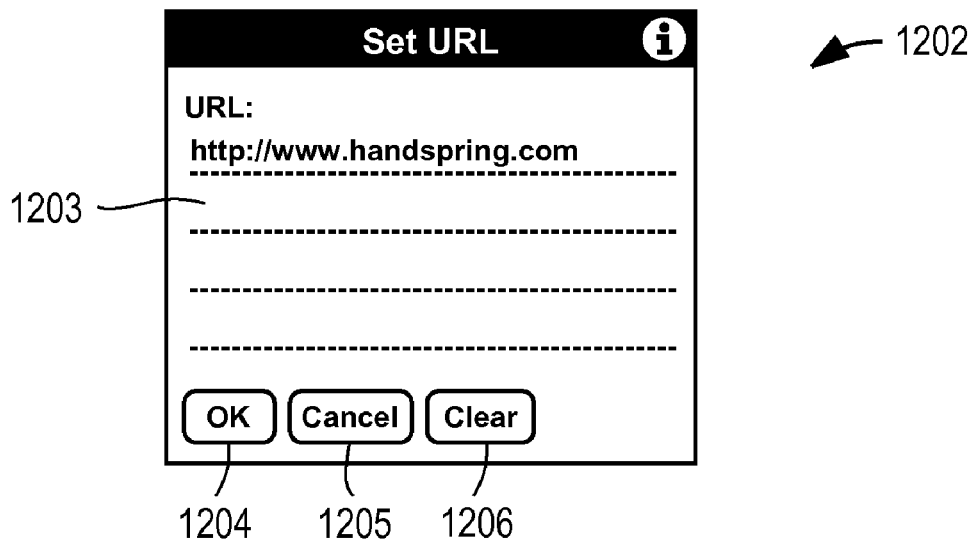

Referring now to FIGS. 12A and 12B, there are shown screens 1200, 1202 for configuring a favorites button 701 as a web link button. Screen 1200 allows a user to specify, in field 903, a label (such as text) for button 701. The user can also specify, via button 1201, a location (such as a URL) to be associated with button 701. In one embodiment, button 1201 is a "hot-text" button that causes dialog box 1202, as shown in FIG. 12B, to be displayed. Here the user can enter a URL in field 1203. OK button 1204 accepts the entered URL; Cancel button 1205 dismisses dialog box 1202; and Clear button 1206 clears field 1203.

The user can also specify a keyboard shortcut in field 905. If the user selects a keyboard shortcut that is already in use, the device can inform the user of the conflict and ask that the user provide a different keyboard shortcut. If the user selects an invalid keyboard shortcut key (such as a non-alphanumeric key), an alert, such as an audible beep, can be provided. OK button 906 dismisses screen 900 and accepts the user's entries and configures button 701 accordingly. The user is returned to the favorites view, with the newly-added or edited button 701 having focus. Cancel button 907 cancels the configuration operation.

Figure 13:
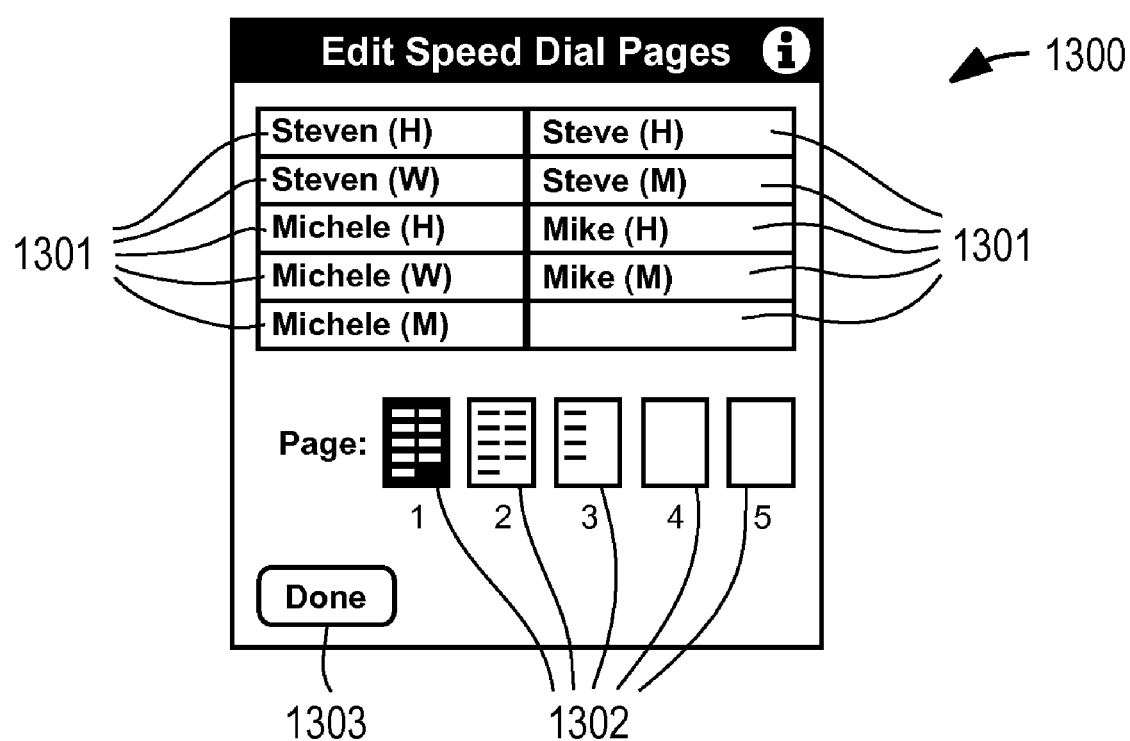
FIG. 13 depicts a screen for editing favorites buttons according to one embodiment.

Referring now to FIG. 13, there is shown screen 1300 for editing favorites buttons 701 according to one embodiment. Screen 1300 may be activated, for example, by selecting an "Edit Favorites Pages" command from an onscreen menu.

The user can navigate among the various elements of screen 1300 using five-way button 104, and can activate an element that currently has focus by pressing activation switch 106. Buttons 1301 correspond to favorites buttons 701. Activating one of buttons 1301 displays an Edit Favorites screen (as described above in connection with FIG. 9C) for the favorites button 701 corresponding to the activated button 1301. Alternatively, the user can activate a button 1301 by tapping on it. Activating a page button 1302 causes screen 1300 to show buttons 1301 for that page. Done button 1303 dismisses screen 1300. In one embodiment, a Cancel button can be provided, to dismiss screen 1300 and reverse any changes that have been made since screen 1300 was displayed.

The user can rearrange buttons 1301 by dragging them. The corresponding button 701 is moved to a location corresponding the slot at which the user stopped dragging. Existing entries are pushed down the left column, looping to the top of the right column and pushing down the right column if necessary. If there is an empty slot immediately below the occupied destination slot, the button 701 currently occupying the slot is moved down one position to the empty slot. If the slot immediately below the destination slot is occupied, buttons 701 below the destination slot are shifted down until an empty slot is found and filled.

Dragging a button 1301 onto a page icon moves the corresponding button 701 into the first unoccupied spot on the target page. If there are no empty slots on the new page, a beep sounds, indicating that the customer cannot drag to that page. If a record is successfully moved to a new page, the new page is displayed.

If the customer drags button 1301 to a location outside of the button list area and outside of page icons 1302, the rearranging action is cancelled.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. In a communication device, a method for initiating a communication with a destination party, comprising:
   providing for display a plurality of speed-dial buttons for initiating communication with a plurality of contacts, each speed-dial button assignable to one of a set of communication modes and associated with a contact, the plurality of speed-dial buttons organized into a plurality of banks, each bank comprising at least one speed-dial button and associated with a selectable icon;
   detecting user activation of a speed-dial button corresponding to a first previously stored handle representing a first communication mode for contacting the destination party associated with the speed-dial button;
   determining whether at least a second previously stored handle exists representing a second communication mode for the destination party associated with the speed dial button; and
   responsive to a determination that least a second previously stored handle exists:
      displaying at least two communication modes for the destination party associated with the speed dial-button, each displayed communication mode corresponding to a communication mode for contacting the destination party using a handle associated with the destination party,
      receiving user selection of one of the displayed communication modes; and
      initiating communication with the destination party, using the selected communication mode to contact the destination party.

2. The method of claim 1, further comprising:
   responsive to a determination that only one previously stored handle exists:
      initiating communication with the destination party, using a communication mode associated with the first previously stored handle.

3. The communication device of claim 1, wherein each speed-dial button comprises a visual indicator of a communication mode associated with the speed-dial button.

4. A user interface for a communication device having a display screen, the user interface comprising:
   a plurality of on-screen buttons displayed on the display screen, each button assignable to one of a set of communication mode functions and associated with a contact, the plurality of on-screen buttons organized into a plurality of banks displayed on the display screen, each bank comprising at least one on-screen button, and the user interface further comprises controls for navigating between banks, and
   at least one configuration screen for assigning a button to a function of the set of communication mode functions,
   wherein each button is activatable to perform the function to which it is assigned in response to a single action, and
   wherein the set of communication mode functions comprises a speed dial function and at least one non-speed dial function.

5. The user interface of claim 4, wherein the at least one non-speed dial function comprises at least one selected from the group consisting of:
   launching an application;
   initiating an email communication to a specified recipient;
   initiating an SMS communication to a specified recipient; and
   accessing a web page.

6. The user interface of claim 4, wherein the user interface is navigable via a switch comprising at least two direction controls and an activation switch.

7. The user interface of claim 4, wherein the user interface is navigable via a switch comprising at least four direction controls and an activation switch.

8. The user interface of claim 4, wherein each button comprises a visual indicator of the type of function associated with the button, wherein the visual indicator comprises at least one of a color, an icon, a text label, a pop-up label, a shape, or an outline.

9. The user interface of claim 4 wherein each button comprises a visual indicator of the type of function associated with the button.

10. A method for displaying presence information on a mobile communication device, comprising:
    receiving an electronic communication associated with a communicating party;
    determining, from the electronic communication, identification associated with the communicating party;
    retrieving, in response to the identification, pre-stored contract information corresponding to the communicating party;
    providing for display plurality of on-screen icons, at least two on-screen communication icon corresponding to a distinct communication mode to respond to the communicating party;
    retrieving presence information for the communicating party responsive to the received electronic communication; and
    concurrently with displaying the plurality of on-screen icons, displaying a presence information indicator for the communicating party for each communication mode corresponding to each on-screen icon, the presence information indicator indicating the communicating party's ability to receive data via the communication mode associated with an on-screen icon.

11. The method of claim 10, wherein each on-screen icon comprises an on-screen button and displaying the presence information indicator comprises displaying the indicator within each on-screen button.

12. The method of claim 10, wherein each on-screen icon comprises an on-screen button and displaying the presence information indicator comprises displaying the indicator adjacent to each on-screen button.

13. The method of claim 10, wherein each on-screen icon comprises an on-screen button and displaying the presence information indicator comprises displaying each on-screen button using a color representing the presence information.

14. The method of claim 10, wherein displaying the presence information indicator comprises displaying at least of an icon, a text label, or a speed-dial button.

15. The method of claim 10, wherein retrieving the presence information comprises determining whether the communicating party is available to receive a communication via the communication mode.

16. The method of claim 10, wherein retrieving the presence information comprises determining whether the communicating party is online.

17. The method of claim 10, wherein retrieving the presence information comprises determining whether the communicating party is on the phone.

18. The method of claim 10, wherein retrieving the presence information comprises determining whether the communicating party has specified a presence state.

19. The method of claim 10, wherein each on-screen icon comprises a visual indicator of a communication mode.

* * * * *